US009853484B2

(12) United States Patent
Iwabuchi

(10) Patent No.: US 9,853,484 B2
(45) Date of Patent: Dec. 26, 2017

(54) MOBILE TERMINAL CHARGING DEVICE, AND VEHICLE USING SAME

(71) Applicant: Panasonic Intellectual Property Management Co., Ltd., Osaka (JP)

(72) Inventor: Osamu Iwabuchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 14/893,544

(22) PCT Filed: Apr. 24, 2014

(86) PCT No.: PCT/JP2014/002294
§ 371 (c)(1),
(2) Date: Nov. 24, 2015

(87) PCT Pub. No.: WO2014/192220
PCT Pub. Date: Dec. 4, 2014

(65) Prior Publication Data
US 2016/0111911 A1    Apr. 21, 2016

(30) Foreign Application Priority Data

May 31, 2013    (JP) .................................. 2013-114994

(51) Int. Cl.
*H02J 7/00*    (2006.01)
*H02J 7/02*    (2016.01)
(Continued)

(52) U.S. Cl.
CPC ............ *H02J 7/025* (2013.01); *H02J 7/0044* (2013.01); *H02J 7/042* (2013.01); *H02J 17/00* (2013.01); *H02J 50/10* (2016.02); *H02J 50/90* (2016.02)

(58) Field of Classification Search
CPC .......... H02J 7/025; H02J 7/027; H02J 7/0044; H02J 7/042; H02J 5/005; H02J 50/60; H02J 50/90
(Continued)

(56) References Cited

U.S. PATENT DOCUMENTS 8,305,036 B2    11/2012    Toya et al.
2007/0058219 A1    3/2007    Yamaguchi
(Continued)

FOREIGN PATENT DOCUMENTS

JP    09-321851    12/1997
JP    10-271280    10/1998
(Continued)

OTHER PUBLICATIONS

Extended European Search Report dated Mar. 31, 2016 in European patent application No. 14 804 790.5.
(Continued)

*Primary Examiner* — Paul Dinh
(74) *Attorney, Agent, or Firm* — Wenderoth, Lind & Ponack, L.L.P.

(57) ABSTRACT

The present invention pertains to a mobile terminal charging device, and a vehicle using the same, and the objective of the present invention is to reduce user discomfort. In order to achieve this objective, the present invention moves a charging coil (8) from a charging position to a standby position by means of motors (28, 33) when charging is complete, or when charging is discontinued. The speed when the charging coil (8) is thus moved from the charging position to the standby position is lower than when the charging coil (8) is moved from the standby position to the charging position, and operating noise at the time can be minimised.

7 Claims, 21 Drawing Sheets

(51) Int. Cl.
*H02J 17/00* (2006.01)
*H02J 50/10* (2016.01)
*H02J 50/90* (2016.01)
*H02J 7/04* (2006.01)

(58) Field of Classification Search
USPC .......................................................... 320/108
See application file for complete search history.

(56) References Cited

U.S. PATENT DOCUMENTS

| | | | |
|---|---|---|---|
| 2009/0153098 A1 | 6/2009 | Toya et al. | |
| 2011/0109264 A1* | 5/2011 | Choi | H01F 38/14 320/108 |
| 2012/0119708 A1 | 5/2012 | Toya | |
| 2013/0154554 A1* | 6/2013 | Sakai | H02J 7/025 320/108 |
| 2014/0176068 A1 | 6/2014 | Nishikawa | |
| 2016/0079782 A1* | 3/2016 | Tojo | H02J 5/005 320/108 |
| 2016/0164333 A1* | 6/2016 | Hatakeyama | H02J 5/005 320/108 |

FOREIGN PATENT DOCUMENTS

| | | |
|---|---|---|
| JP | 2001-022253 | 1/2001 |
| JP | 2009-247194 | 10/2009 |
| JP | 2012-016209 | 1/2012 |
| JP | 2012-110135 | 6/2012 |
| WO | 2013/031054 | 3/2013 |

OTHER PUBLICATIONS

International Search Report dated Jun. 10, 2014 in International (PCT) Application No. PCT/JP2014/002294.

* cited by examiner

MOBILE TERMINAL CHARGING DEVICE, AND VEHICLE USING SAME

TECHNICAL FIELD

The present invention relates to a mobile terminal charging apparatus for charging a mobile terminal such as a mobile phone, and an automobile including the mobile terminal charging apparatus.

BACKGROUND ART

Mobile terminals such as mobile phones have been highly sophisticated, and their power consumption has been increased.

Under such a circumstance, it has been desired to carry out charging at various places, including inside an automobile. In recent years, so-called non-contact charging that uses no cables has been attracting attention.

The following mobile terminal charging apparatus has been proposed to meet such demands.

Specifically, the mobile terminal charging apparatus includes: a main body case provided with a mobile terminal placement plate at its top surface; a charging coil movably provided in the main body case to face the bottom surface side of the mobile terminal placement plate; a driving section that moves the charging coil such that the charging coil faces the bottom surface side of the mobile terminal placement plate; and a control section connected with the driving section and the charging coil.

In addition, the mobile terminal placement plate is provided with a plurality of detection coils that detect the position of a mobile terminal placed on the top surface of the mobile terminal placement plate (see, for example, PTL 1).

CITATION LIST

Patent Literature

PTL 1
Japanese Patent Application Laid-Open No. 2009-247194

SUMMARY OF INVENTION

Technical Problem

In the above-mentioned conventional example, when the mobile terminal is put on the top surface of the mobile terminal placement plate, the position of the mobile terminal is detected by the detection coils. The charging coil is moved to the detected position and charging can be carried out in that state, and thus the charging can be efficiently carried out.

In addition, after the charging is completed, the charging coil may possibly be moved from the charging position to the standby position for the next charging. In that case, it is desirable that the movement do not make the user uncomfortable.

That is, while the movement of the charging coil at the time of charging reassures the user that the charging operation is appropriately carried out, the movement of the charging coil in the state where the charging is completed or interrupted is not expected by the user and makes the user uncomfortable.

When driving an automobile in particular, the driver is responsive to sound, and as such the above-mentioned unexpected operation sound is often uncomfortable.

An object of the present invention is to provide a mobile terminal charging apparatus which reduces uncomfortable situations, and an automobile including the mobile terminal charging apparatus.

Solution to Problem

A mobile terminal charging apparatus according to an embodiment of the present invention includes: a main body case including a mobile terminal placement plate disposed on a top surface of the main body case; a detection section that detects a position of a mobile terminal placed on a top surface of the mobile terminal placement plate; a charging coil movably disposed in the main body case to face a bottom surface side of the mobile terminal placement plate; a driving section that moves the charging coil; and a control section connected with the driving section and the charging coil. In the mobile terminal charging apparatus, the control section controls the driving section to move the charging coil from a standby position to a charging position when the mobile terminal is charged with the charging coil, the charging position facing the mobile terminal that is detected by the detection section; the control section controls the driving section to move the charging coil from the charging position to the standby position when the charging is completed or interrupted; and, when the charging coil is moved from the charging position to the standby position, the charging coil is moved at a velocity lower than a velocity of the charging coil that is moved from the standby position to the charging position.

Advantageous Effects of Invention

As described, the embodiment of the present invention includes: a main body case including a mobile terminal placement plate disposed on a top surface of the main body case; a detection section that detects a position of a mobile terminal placed on a top surface of the mobile terminal placement plate; a charging coil movably disposed in the main body case to face a bottom surface side of the mobile terminal placement plate; a driving section that moves the charging coil; and a control section connected with the driving section and the charging coil. Further, in the embodiment of the present invention, the control section controls the driving section to move the charging coil from a standby position to a charging position when the mobile terminal is charged with the charging coil, the charging position facing the mobile terminal that is detected by the detection section; the control section controls the driving section to move the charging coil from the charging position to the standby position when the charging is completed or interrupted; and, when the charging coil is moved from the charging position to the standby position, the charging coil is moved at a velocity lower than a velocity of the charging coil that is moved from the standby position to the charging position. Consequently, the operation sound can be made less uncomfortable for the user.

That is, in the embodiment of the present invention, when charging is completed or interrupted, the charging coil is moved by the driving section from the charging position to the standby position. When the charging coil is moved from the charging position to the standby position in this manner, the velocity of the charging coil is lower than that of the charging coil that is moved from the standby position to the charging position, and the operation sound of the charging coil that is moved from the charging position to the standby position is significantly small. Thus, the operation sound can be made less uncomfortable for the user.

DESCRIPTION OF EMBODIMENTS

In the following, an embodiment of the present invention is described with reference to the accompanying drawings.

Embodiment 1

Figure 1:
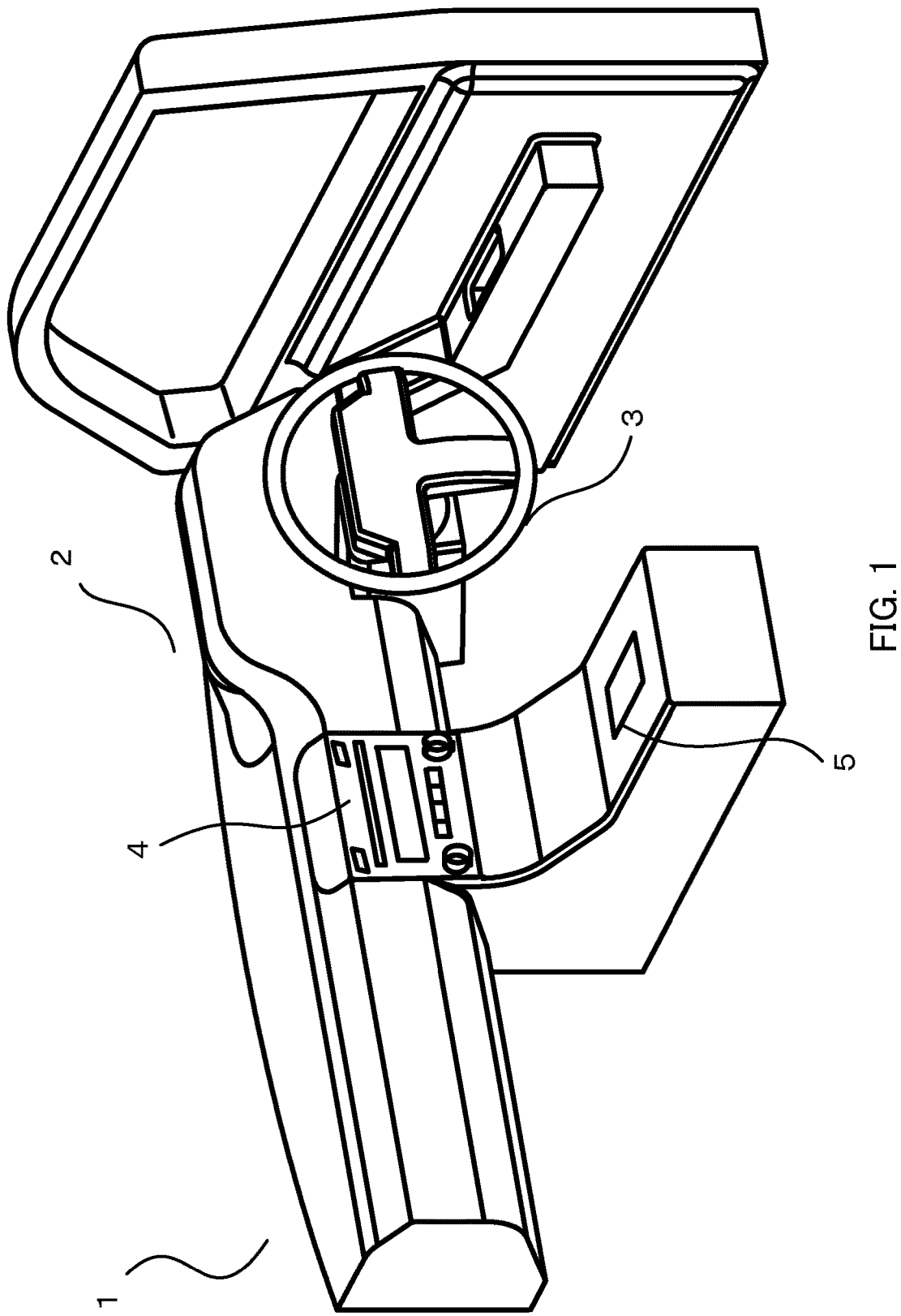
FIG. 1 is a perspective view illustrating a state where a mobile terminal charging apparatus of an embodiment of the present invention is provided inside an automobile.

In FIG. 1, wheel 3 is disposed on the front side of vehicle interior 2 of automobile 1.

In addition, electronic equipment 4 that reproduces music and images and displays car navigation images is disposed on a side of wheel 3.

Further, mobile terminal charging apparatus 5 is disposed on a lower and rear side of electronic equipment 4 of vehicle interior 2.

As illustrated in FIG. 2 to FIG. 6, mobile terminal charging apparatus 5 includes box-type main body case 7 that is provided with mobile terminal placement plate 6 at its top surface, charging coil 8 that is provided in main body case 7 such that it faces the bottom surface side of the mobile terminal placement plate 6 and is movable in the horizontal direction, driving section 9 that horizontally moves charging coil 8 facing the bottom surface side of the mobile terminal placement plate 6, and a control section (10 in FIG. 9) that is connected with driving section 9 and the charging coil 8.

In the following, the components are described in detail.

First, mobile terminal placement plate 6 is described.

Figure 6:
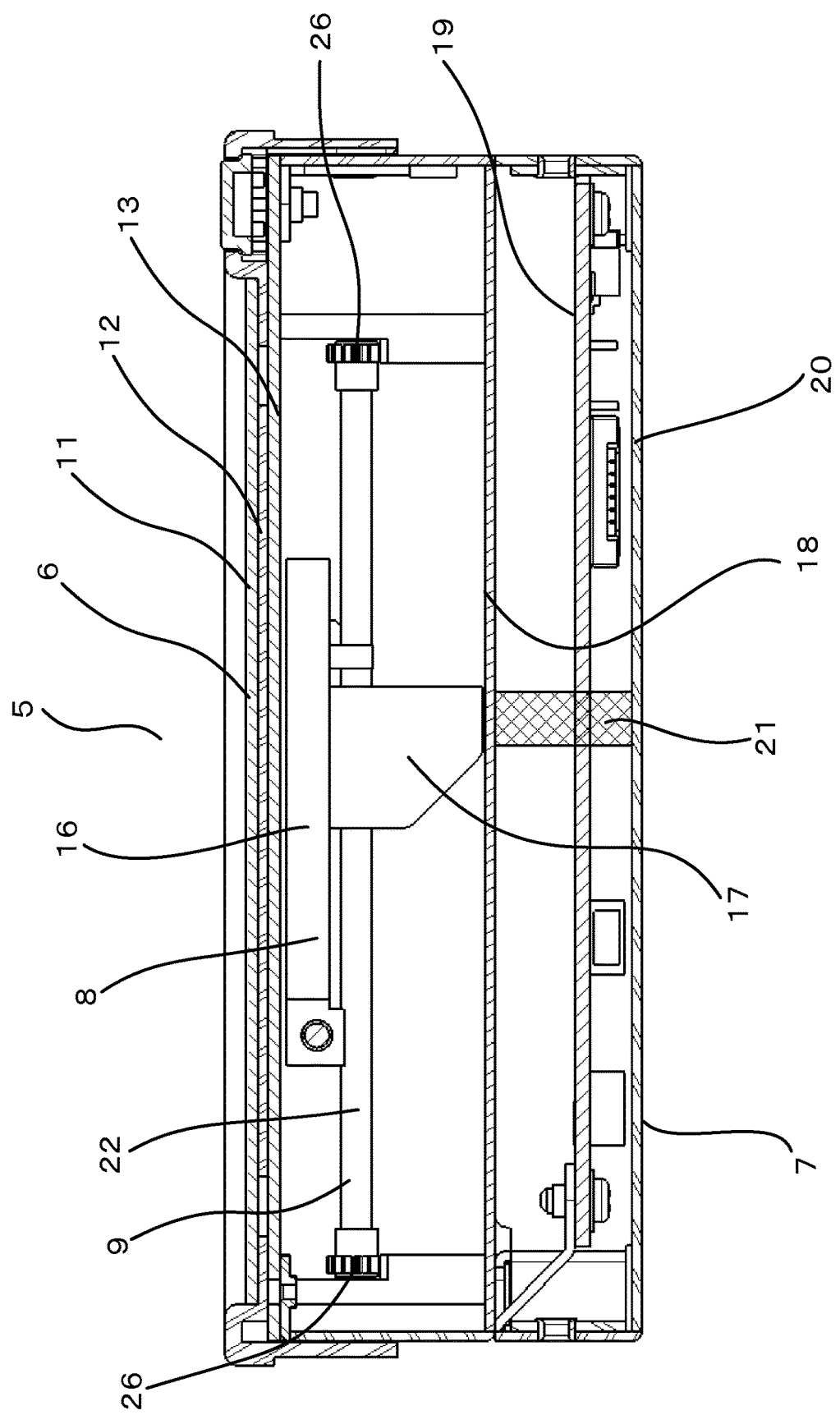
FIG. 6 is a partially cutout perspective view of the same.
Figure 7:
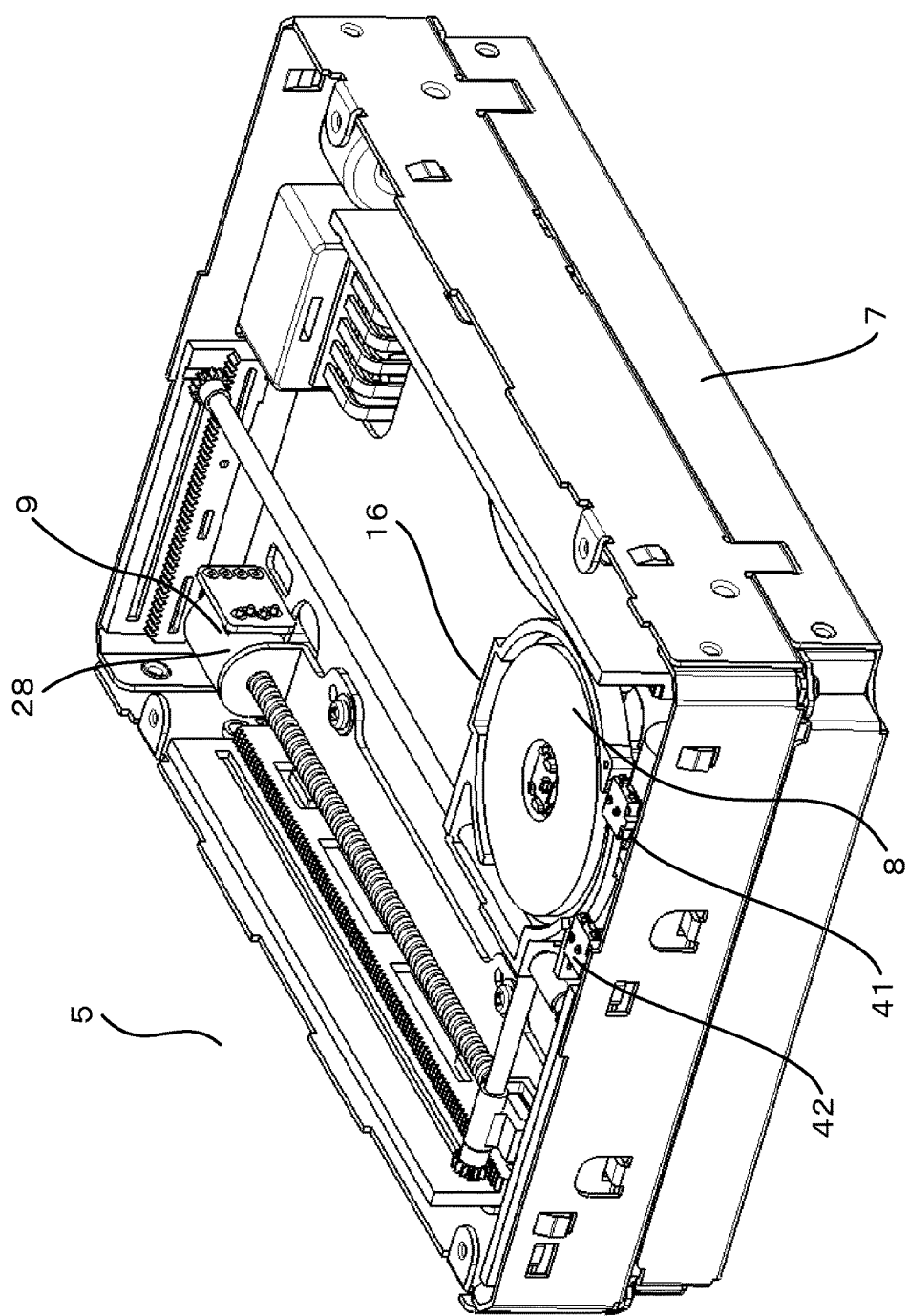
FIG. 7 is a perspective view of the same in which a part is removed.
Figure 8:
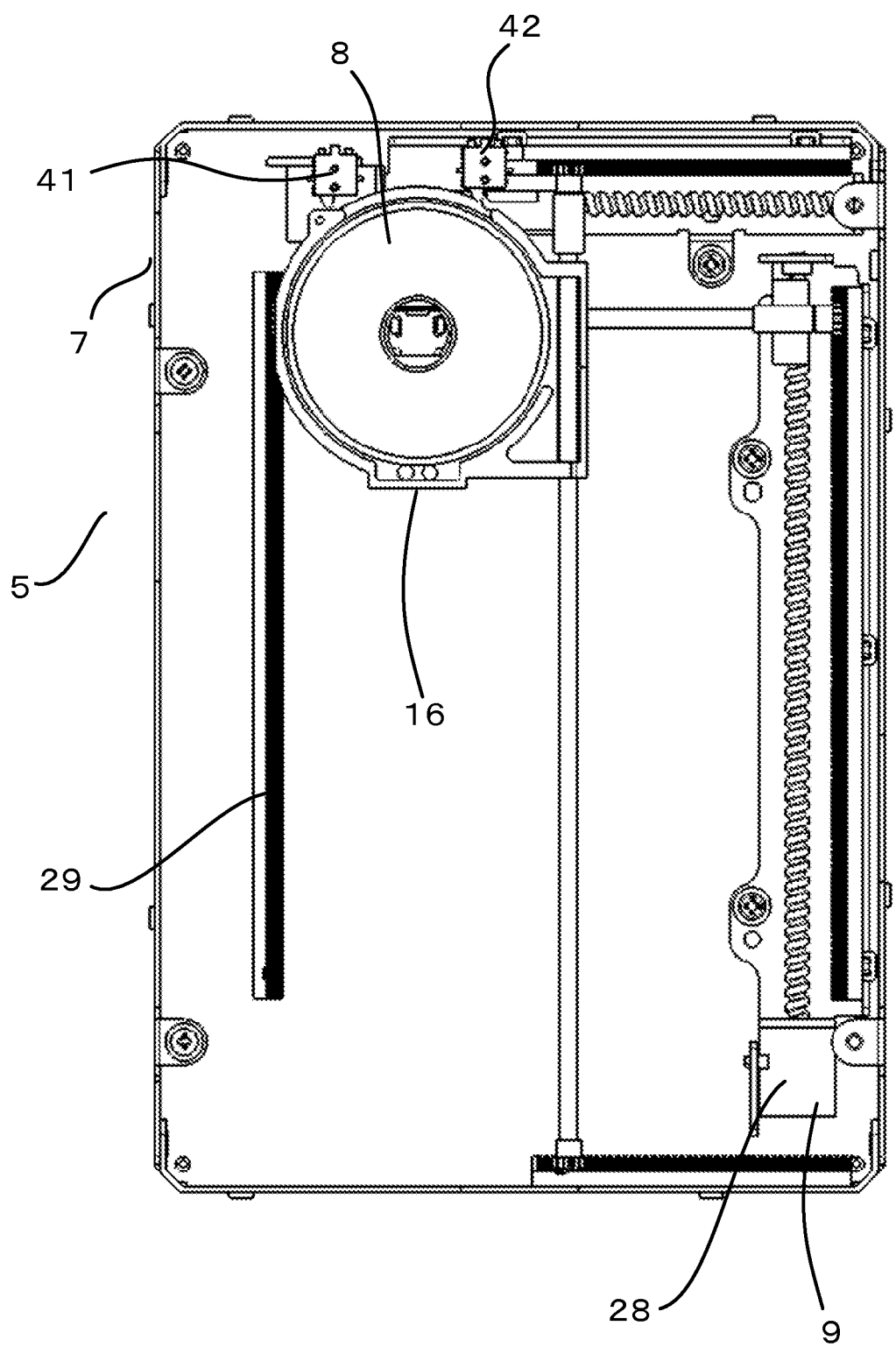
FIG. 8 is a plan view of the same in which a part is removed.

As illustrated in FIG. 6, mobile terminal placement plate 6 has a configuration in which front surface plate 11, intermediate plate 12, and rear surface plate 13 are stacked on one another.

In addition, front surface plate 11 and rear surface plate 13 are formed of a synthetic resin, and intermediate plate 12 is formed of a ceramic. That is, a magnetic flux from charging coil 8 can pass through mobile terminal placement plate 6 toward mobile terminal 15.

Figure 9:
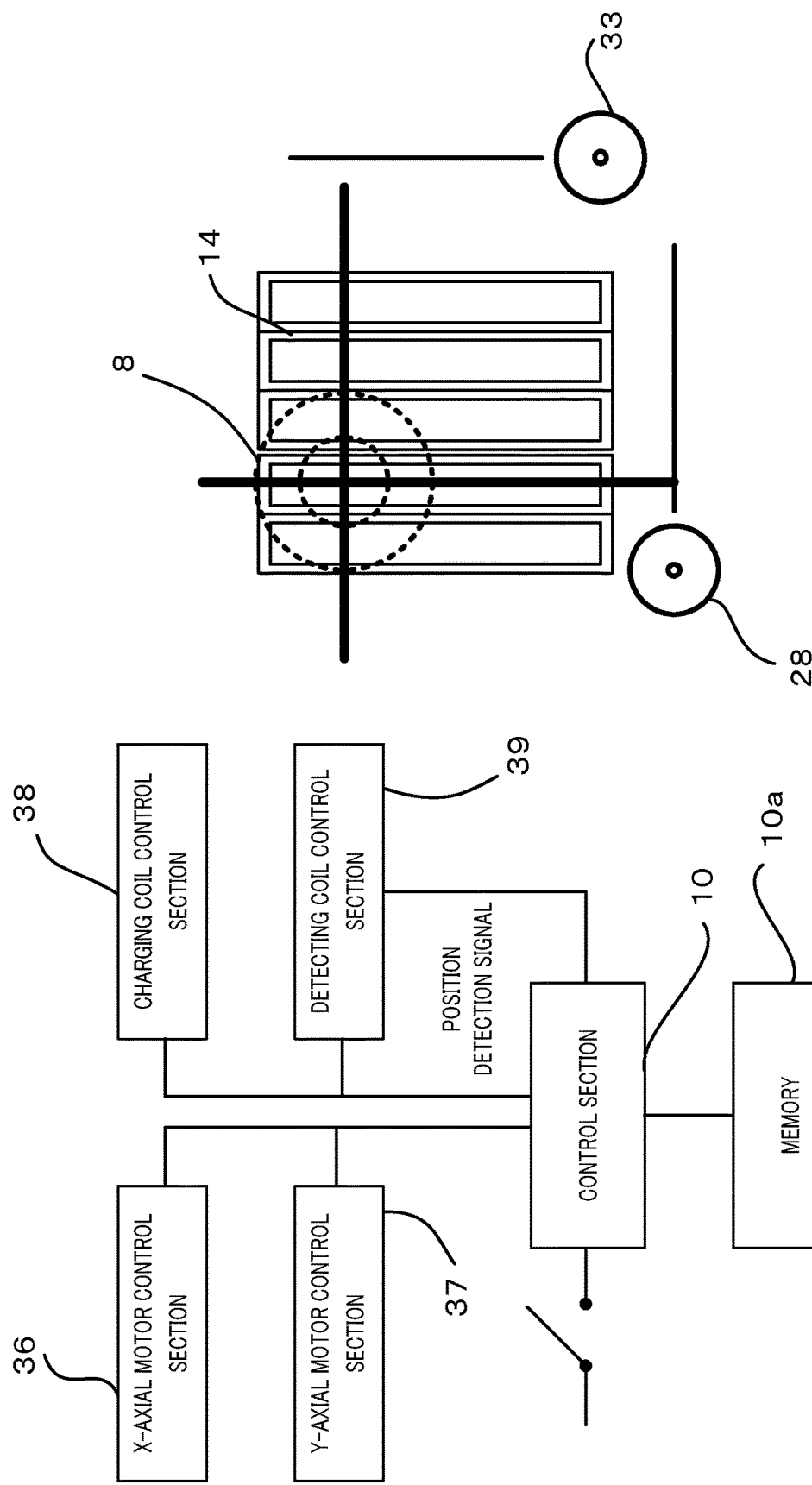
FIG. 9 is a control block diagram of the same.

In addition, position detection coil 14 illustrated in FIG. 9 is provided on a surface of intermediate plate 12.

Position detection coil 14 detects a position where mobile terminal 15 is put on the top surface of mobile terminal placement plate 6.

In the present embodiment, position detection coil 14 is used to detect a position where mobile terminal 15 is put on the top surface of mobile terminal placement plate 6, and then charging coil 8 is moved by driving section 9 to a charging coil position (not illustrated) of the mobile terminal 15.

Next, charging coil 8 is described.

Figure 4:
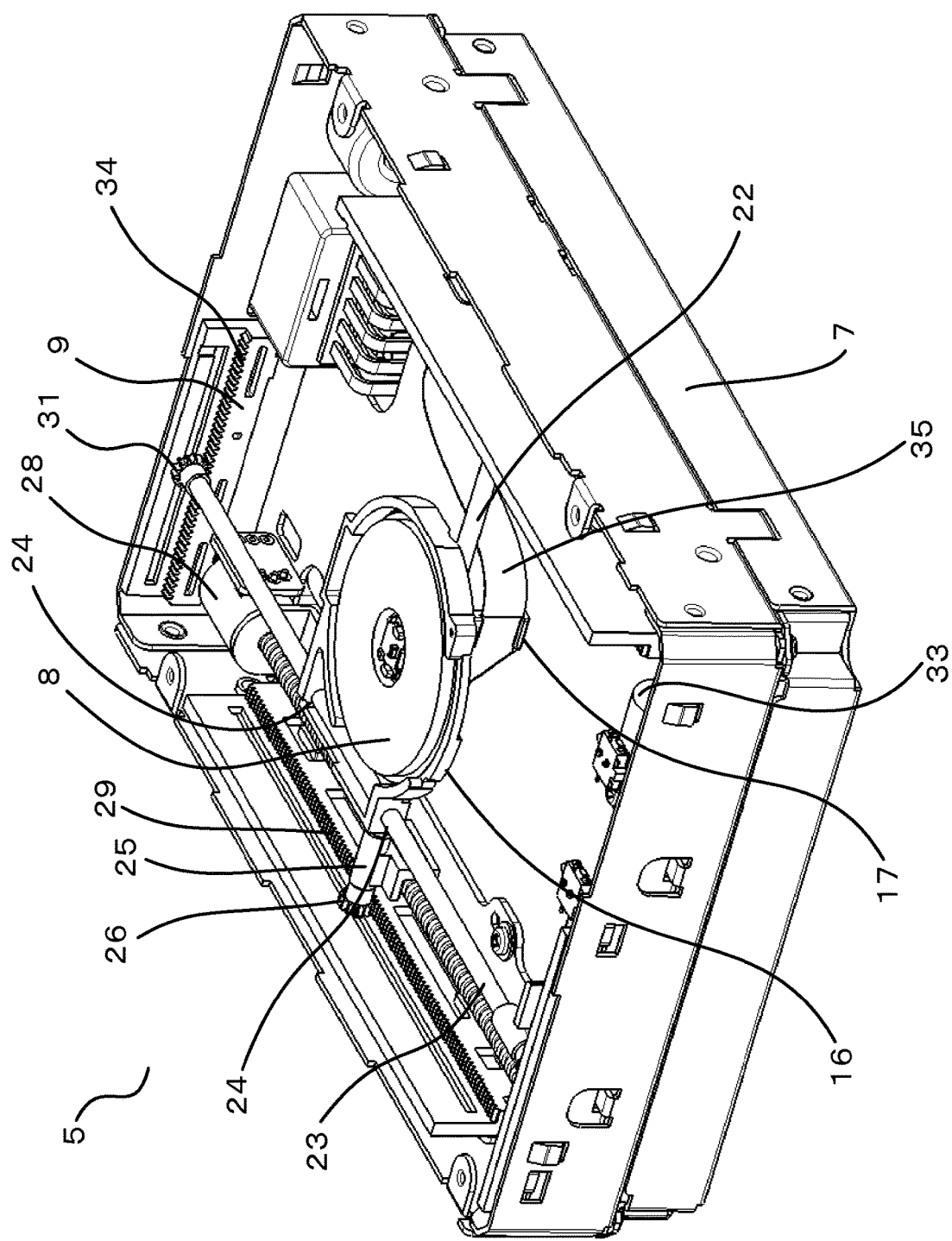
FIG. 4 is a perspective view of the same in which a part is removed.
Figure 5:
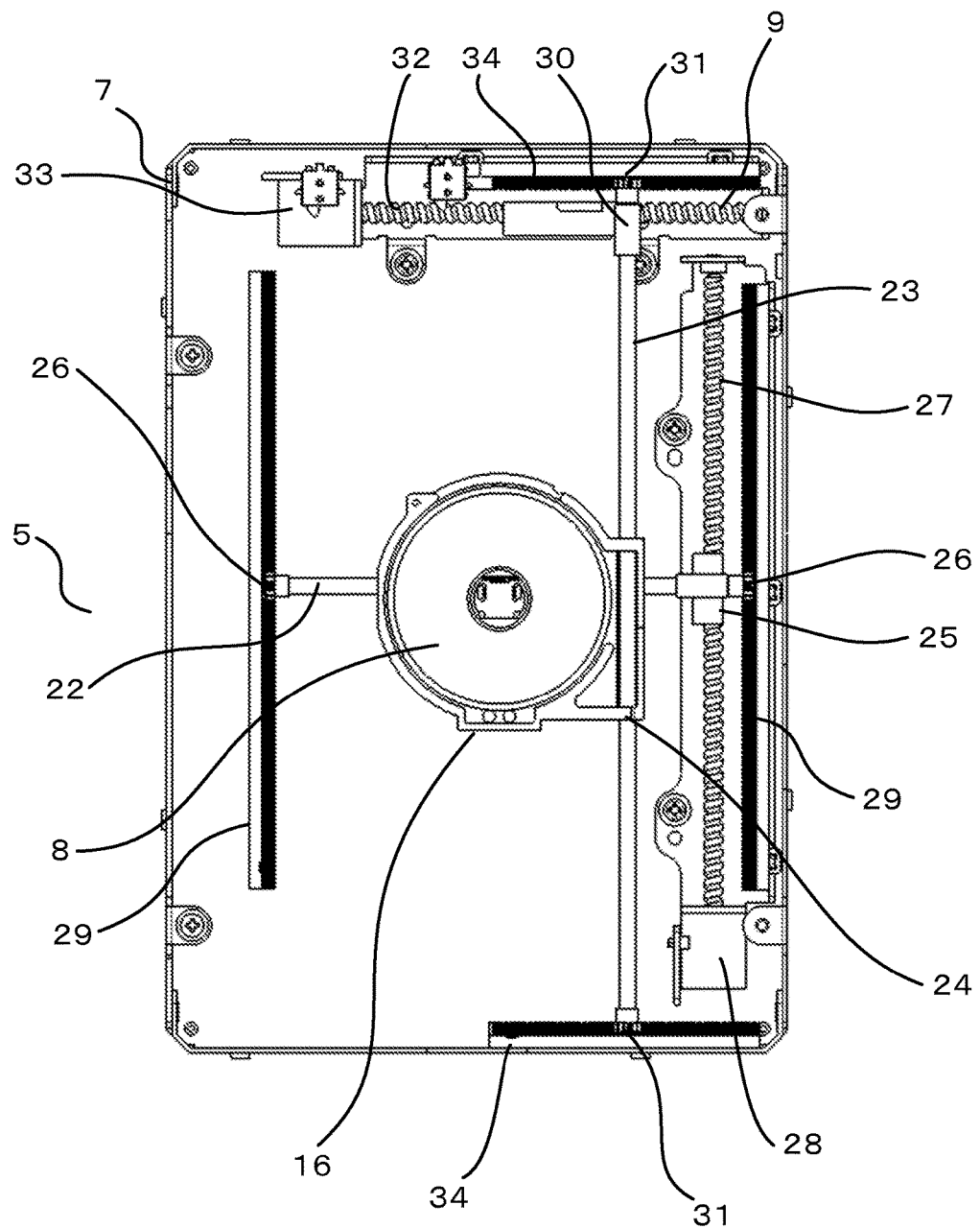
FIG. 5 is a plan view of the same in which a part is removed.

As can be seen in FIG. 4 and FIG. 5, charging coil 8 is configured by repeatedly wounding a lead into an annular form, and is held such that its outer periphery side and bottom surface side are covered with holding member 16 formed of a synthetic resin.

In addition, as illustrated in FIG. 6, support leg 17 formed of a synthetic resin is integrally formed on the bottom surface of holding member 16 to extend downward of charging coil 8.

In addition, a 0.3 mm gap is provided between the bottom surface of support leg 17 and the top surface of metal support plate 18 disposed below support leg 17, and therefore, in a normal state, the bottom surface of support leg 17 does not make contact with the top surface of support plate 18 when charging coil 8 moves.

In the above-mentioned configuration, support leg 17 is provided below charging coil 8 in the present embodiment.

It is to be noted that control substrate 19 and bottom surface plate 20 of main body case 7 are disposed below support plate 18, and supporting member 21 penetrating control substrate 19 is provided between the bottom surface of support plate 18 and the top surface of bottom surface plate 20.

Next, driving section 9 is described.

As illustrated in FIG. 4 and FIG. 5, driving section 9 includes X-axial drive shaft 22 and Y-axial drive shaft 23 which are engaged with holding member 16 at intermediate portions thereof except for the charging coil holding portion of holding member 16.

Specifically, holding member 16 is provided with a through hole (not illustrated) through which X-axial drive shaft 22 penetrates and through hole 24 through which Y-axial drive shaft 23 penetrates, and the through holes are crossed with a predetermined space therebetween in a vertical direction. When X-axial drive shaft 22 and Y-axial drive shaft 23 penetrate the through holes, the engaging state is established.

In addition, worm wheel 25 is provided on one end side of X-axial drive shaft 22, and gear 26 is provided at each of the one end and the other end of X-axial drive shaft 22.

Worm wheel 25 is engaged with worm 27, and worm 27 is coupled with motor 28.

In addition, each of gears 26 on the both sides is engaged with gear plate 29.

Accordingly, when motor 28 is driven, worm 27 rotates such that worm wheel 25 moves together with X-axial drive shaft 22 in the X-axis direction, and that charging coil 8 moves in the X-axis direction.

In addition, worm wheel 30 is provided on one end side of Y-axial drive shaft 23, and gear 31 is provided at each of the one end and the other end of Y-axial drive shaft 23.

Worm wheel 30 is engaged with worm 32, and worm 32 is coupled with motor 33.

In addition, each of gears 31 on the both sides is engaged with gear plate 34.

Accordingly, when motor 33 is driven, worm 32 rotates such that worm wheel 30 moves together with the Y-axial drive shaft 23 in the Y-axis direction, and that charging coil 8 moves in the Y-axis direction.

Here, motors 28 and 33 are described in more detail.

Preferably, each of motors 28 and 33 is composed of a stepping motor that performs an intermittent step operation in accordance with input pulse power. The velocity of the stepping motor is typically expressed by [pps], which is the number of pulses (steps) per second and is referred to as pulse rate, or step rate.

It is to be noted that the reference numeral 35 shown in FIG. 4 denotes a flexible wiring for energizing charging coil 8, and an end portion of flexible wiring 35 is fixed at the side surface of support leg 17.

In addition, as illustrated in FIG. 9, control section 10 is connected with motor 28 and motor 33 through X-axial motor control section 36 and through Y-axial motor control section 37, respectively.

In addition, control section 10 is connected with charging coil 8 and position detection coil 14 through charging coil control section 38 and through detecting coil control section 39, respectively.

With this configuration, in the present embodiment, when the power switch is turned OFF (at S1 in FIG. 10), charging coil 8 is moved to a center of main body case 7 (hereinafter referred to as point A) (at S2 in FIG. 10) as illustrated in FIG. 4 to FIG. 6, and thereafter the power source is turned OFF (at S3 in FIG. 10).

Figure 2:
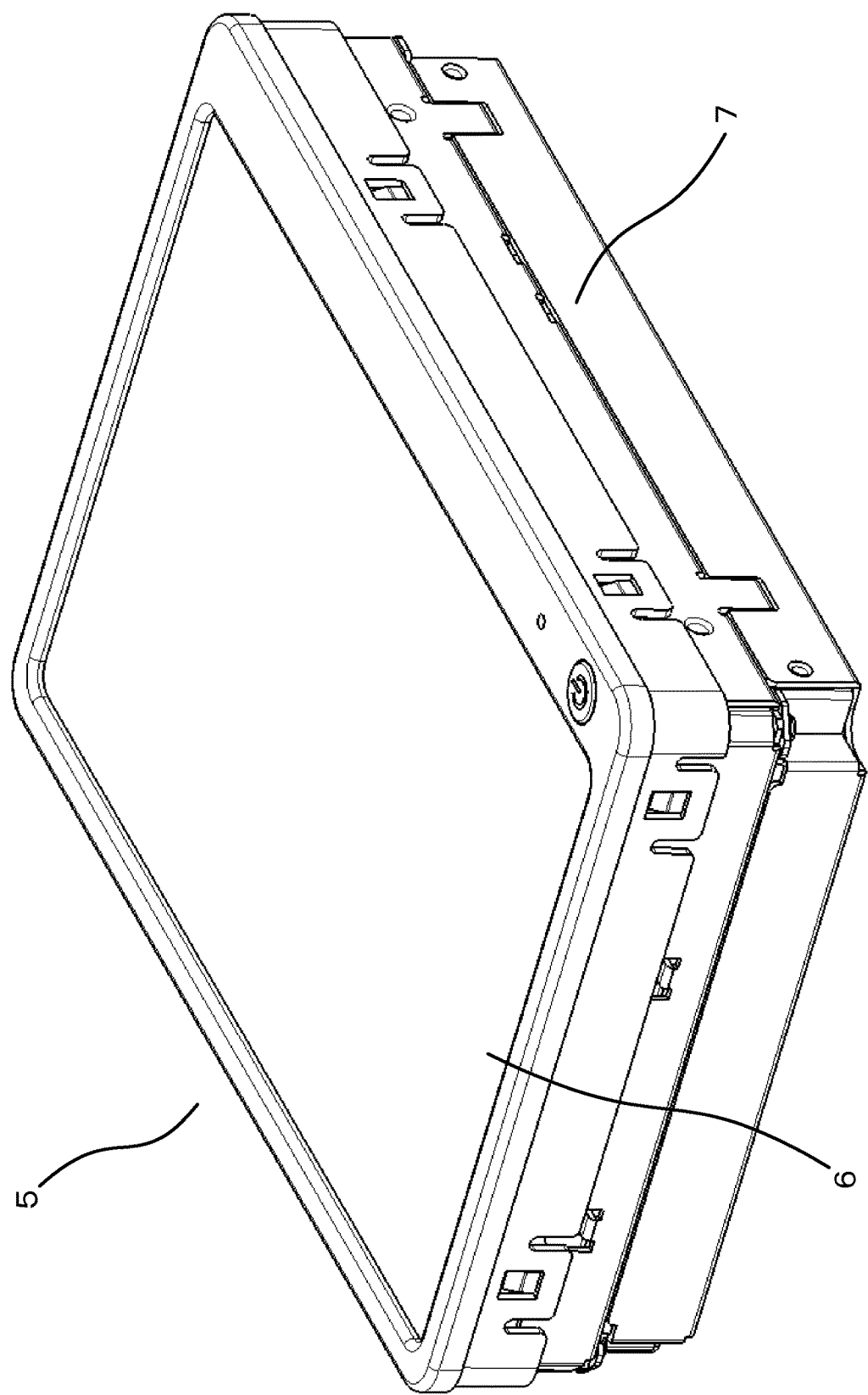
FIG. 2 is a perspective view of the same.
Figure 3:
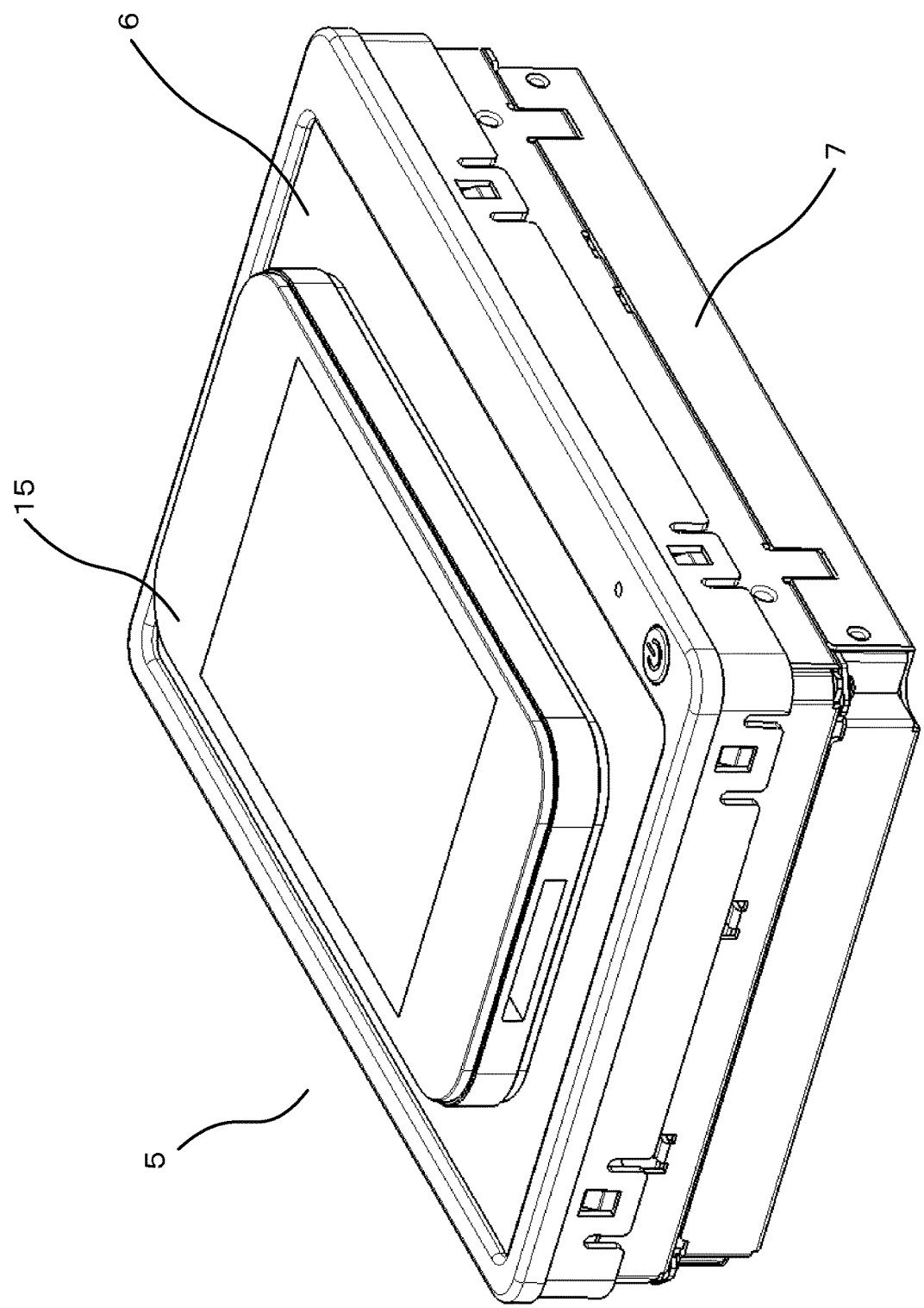
FIG. 3 is a perspective view of the same.

That is, when mobile terminal 15 is not put on mobile terminal placement plate 6 of main body case 7 as illustrated in FIG. 2, mobile terminal placement plate 6 is exposed to vehicle interior 2 as illustrated in FIG. 1.

Accordingly, mobile terminal placement plate 6 may be mistakenly touched with hands, and in that case, overload is exerted on mobile terminal placement plate 6.

In view of this, in the present embodiment, charging coil 8 is moved to a center portion of main body case 7 as illustrated in FIG. 4 to FIG. 6 to bear the above-described overload with charging coil 8, holding member 16, support leg 17, and support plate 18.

Specifically, in the state where an overload is exerted on mobile terminal placement plate 6, mobile terminal placement plate 6 is slightly curved downward. In this state, charging coil 8, holding member 16, and support leg 17 also move downward, and the bottom surface of support leg 17 makes contact with the top surface of support plate 18.

As a result, the overload is borne with support plate 18 through mobile terminal placement plate 6, charging coil 8, holding member 16 and support leg 17, and thus it is possible to limit a damage of mobile terminal placement plate 6 and charging coil 8.

It is to be noted that, in the present embodiment, the bottom surface side of support plate 18 is supported with bottom surface plate 20 of main body case 7 through supporting member 21 in order to increase the strength against the overload.

In addition, when such an overload is removed, mobile terminal placement plate 6 elastically returns upward, and charging coil 8 and holding member 16 upwardly return with the elastic return of X-axial drive shaft 22 and Y-axial drive shaft 23, thus establishing the state where a gap is interposed between the bottom surface of support leg 17 and the top surface of support plate 18.

In this manner, the movement of charging coil 8 described below is not impeded.

In addition, at the time of charging mobile terminal 15, first, the power switch is turned ON (at S4 in FIG. 10), and mobile terminal 15 is put on the top surface of mobile terminal placement plate 6.

Figure 10:
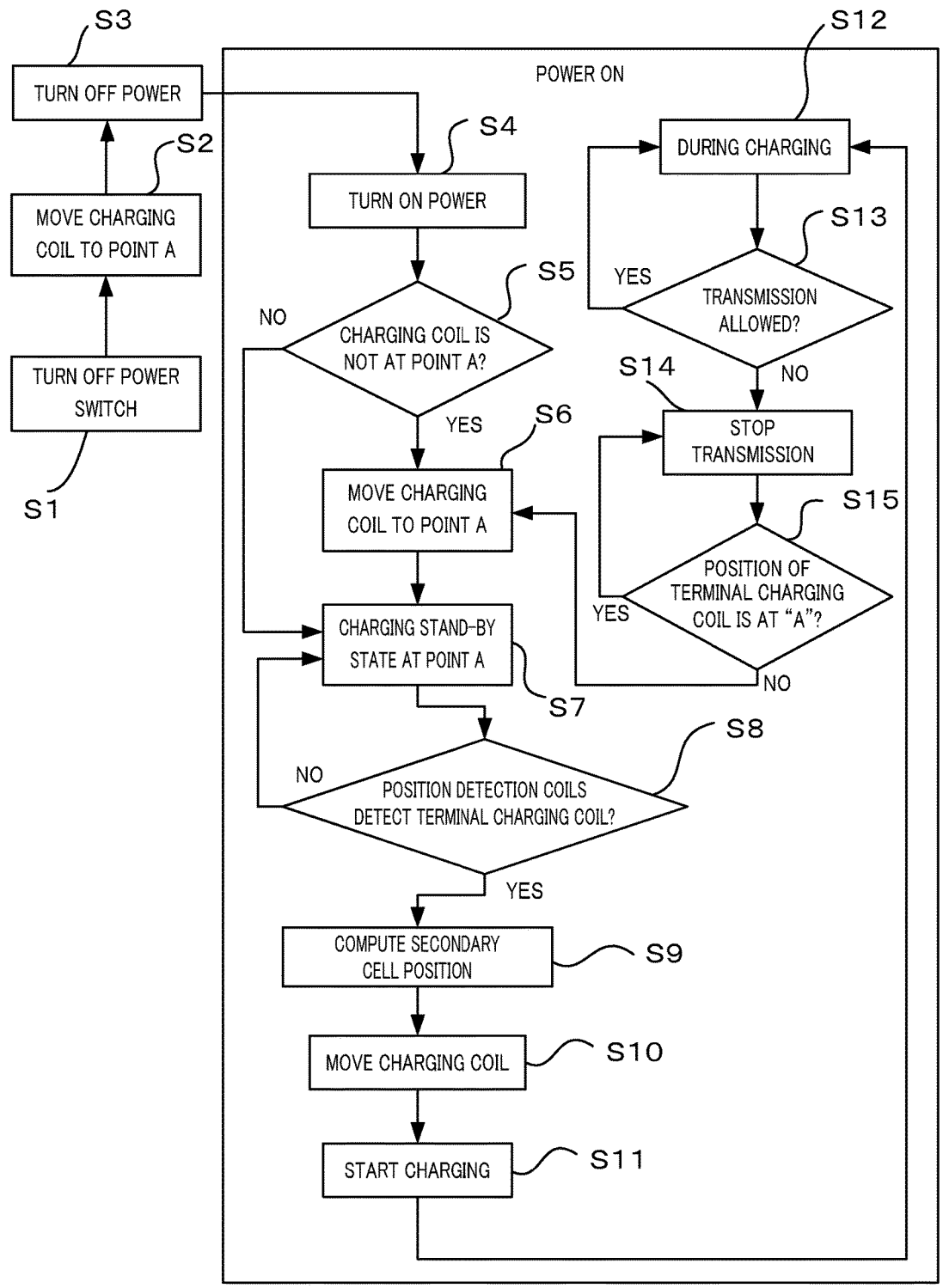
FIG. 10 is a flowchart of an operation of the same.

Also in this state, first, control section 10 determines whether charging coil 8 is present at point A in the present embodiment (at S5 in FIG. 10).

This determination can be carried out based on the driving amount of the motors 28 and 33 that is stored in X-axial motor control section 36 and Y-axial motor control section 37.

When it is determined that charging coil 8 is not present at point A, control section 10 moves charging coil 8 to point A (at S6 in FIG. 10), and brings charging coil 8 into a charging standby state at point A (at S7 in FIG. 10).

Next, control section 10 uses position detection coil 14 to detect the position where mobile terminal 15 is put on the top surface of mobile terminal placement plate 6 (at S8 and S9 in FIG. 10).

Actually, the position where mobile terminal 15 is put is the position of a mobile charging coil (15a in FIG. 16) incorporated in mobile terminal 15.

Thereafter, control section 10 drives motors 28 and 33 through X-axial motor control section 36 and Y-axial motor control section 37, and moves charging coil 8 to the position of the mobile charging coil (15a in FIG. 16) of mobile terminal 15 (at S10 in FIG. 10). Then, control section 10 starts charging through charging coil control section 38 (at S11 and S12 in FIG. 10).

In addition, during the charging, an operation same as that disclosed in PTL 1 (Japanese Patent Application Laid-Open No. 2009-247194) is carried out. Specifically, through communication with a terminal charging coil, it is determined whether power transmission is allowed (or the charging has been completed) (at S13 in FIG. 10), and when it is determined that the power transmission is not allowed (full charge), control section 10 stops the power transmission (at S14 in FIG. 10).

In addition, when the above-mentioned charging operation is completed, control section 10 determines whether charging coil 8 is present at point A (at S15 in FIG. 10), and thereafter, brings back charging coil 8 to point A (at S6 in FIG. 10).

This determination can be carried out based on the driving amount of motors 28 and 33 that is stored in X-axial motor control section 36 and Y-axial motor control section 37.

It is to be noted that the following operation is executed when control section 10 cannot bring back charging coil 8 to point A, for example, when the position calculated from the driving amount of motors 28 and 33 that is stored in X-axial motor control section 36 and Y-axial motor control section 37 and the actual position measured by position detection coil 14 are shifted due to an impact during the operation.

Specifically, control section 10 drives motors 28 and 33 through X-axial motor control section 36 and Y-axial motor control section 37 to move charging coil 8 to a corner in main body case 7.

Switches 41 and 42 are provided at the corner portion, and when charging coil 8 is moved to the corner in main body case 7, switches 41 and 42 are activated, and based on the activation, control section 10 determines that charging coil 8 is moved to a position corresponding to the initial value.

In this state, the amount of operation of motors 28 and 33 by X-axial motor control section 36 and Y-axial motor control section 37 is set to the initial value, and a position control is again performed from this position.

As described, in the present embodiment, control section 10 brings back charging coil 8 to point A at the time when the charging operation is completed. This configuration is described below in more detail.

The point A is located at a center portion of main body case 7 as described above, and the relationship between the point A and position detection coil 14 is as follows.

First, position detection coil 14 is described.

Position detection coil 14 is provided in ceramic intermediate plate 12 of mobile terminal placement plate 6. Specifically, as illustrated in FIG. 11, position detection coil 14A that detects the X-axial position is provided on the front side of intermediate plate 12, and position detection coil 14B that detects Y-axial position is provided on the rear side of intermediate plate 12.

It is to be noted that position detection coil 14A and position detection coil 14B are orthogonal to each other through ceramic intermediate plate 12 of mobile terminal placement plate 6.

Figure 11:
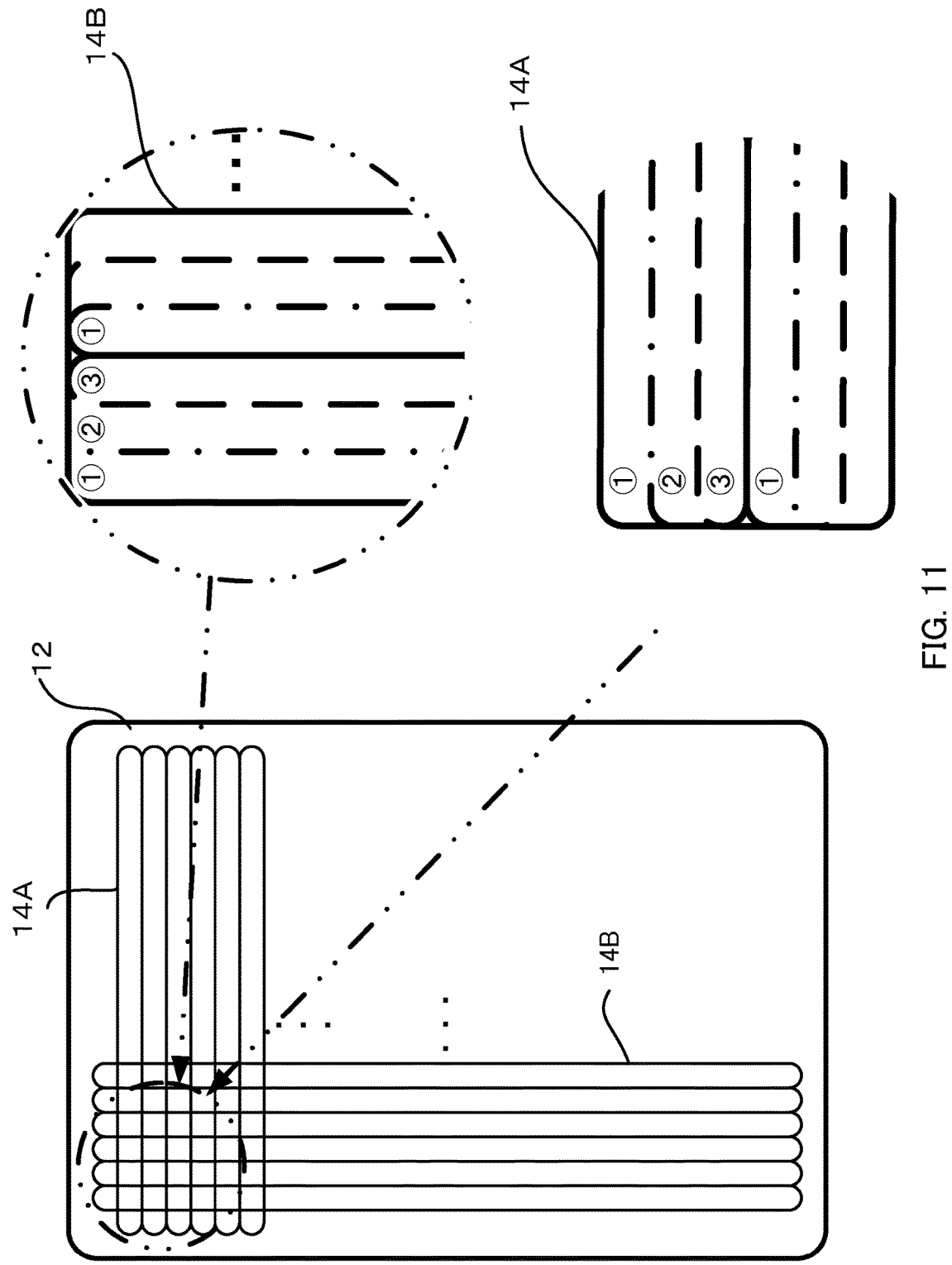
FIG. 11 illustrates a detection coil of the same.
Figure 12:
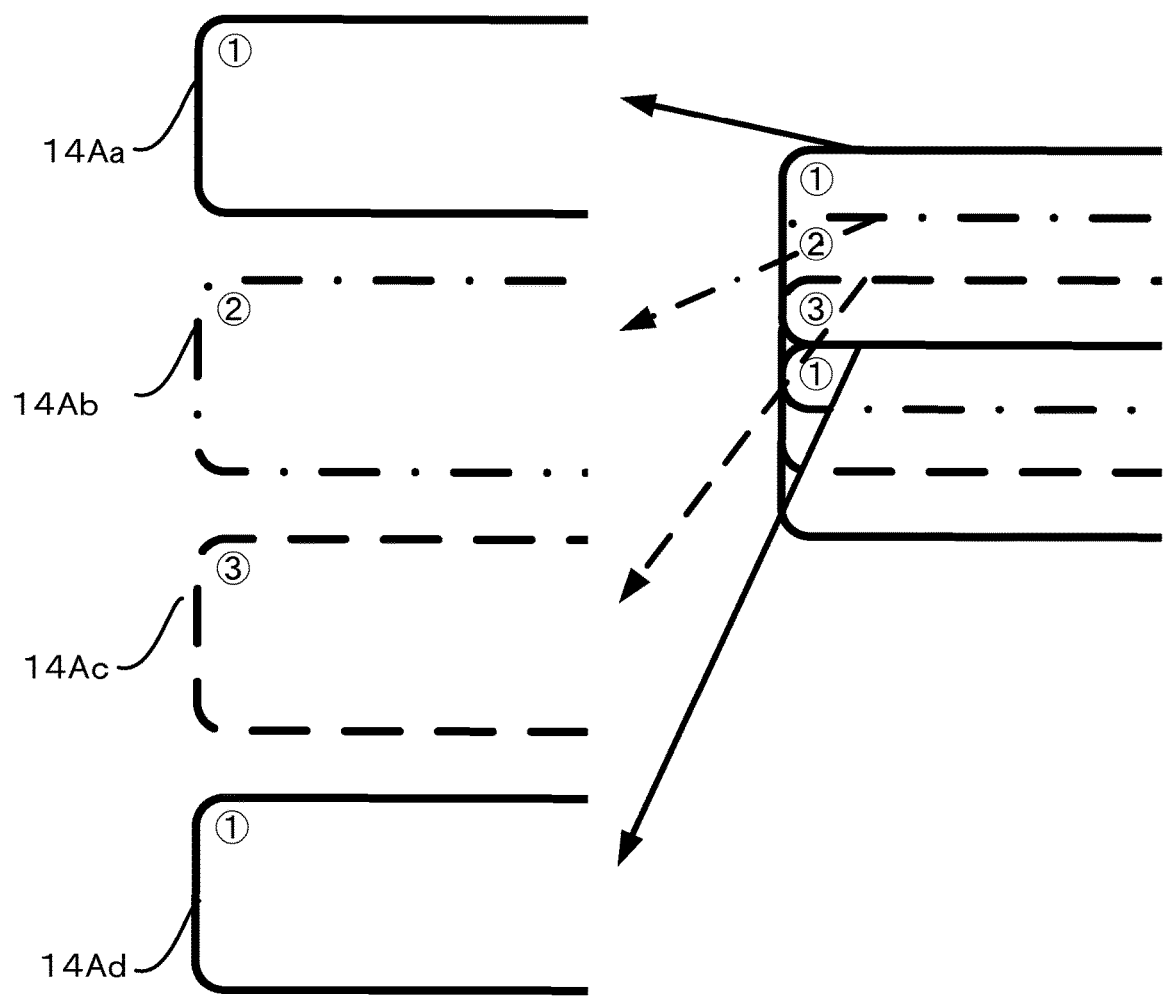
FIG. 12 illustrates the detection coil of the same.

As can be seen in FIG. 11 and FIG. 12, position detection coil 14A that detects the X-axial position detect is composed of a plurality of position detection coils 14Aa, 14Ab, 14Ac and 14Ad that are disposed along the longitudinal direction of ceramic intermediate plate 12 of mobile terminal placement plate 6 with predetermined intervals therebetween.

As illustrated in FIG. 12, each of position detection coils 14Aa, 14Ab, 14Ac and 14Ad has a rectangular loop form, and is sifted by one-third of its short side.

That is, in FIG. 12, the lower side of position detection coil 14Aa and the upper side of position detection coil 14Ad overlap each other.

In the above-mentioned state, position detection coils 14Aa, 14Ab, 14Ac and 14Ad are regularly disposed in the longitudinal direction of ceramic intermediate plate 12 of mobile terminal placement plate 6.

Figure 13:
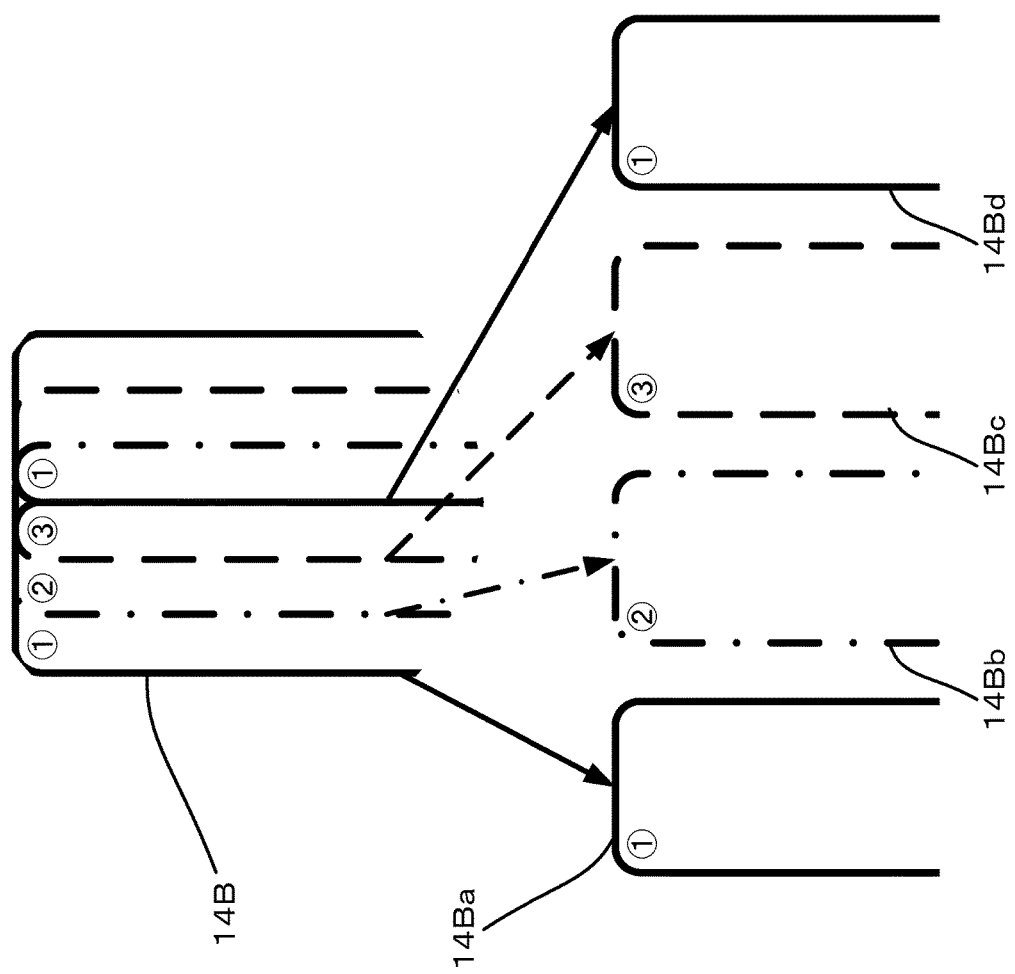
FIG. 13 illustrates the detection coil of the same.

In contrast, as can be seen in FIG. 11 and FIG. 13, position detection coil 14B that detects the Y-axial position is composed of a plurality of position detection coils 14Ba, 14Bb, 14Bc and 14Bd that are disposed along the short direction of ceramic intermediate plate 12 of mobile terminal placement plate 6 with predetermined intervals therebetween.

As illustrated in FIG. 13, each of position detection coils 14Ba, 14Bb, 14Bc and 14Bd has a rectangular loop form, and is sifted by one-third of its short side.

That is, in FIG. 13, the right side of position detection coil 14Ba and the left side of position detection coil 14Bd overlap each other.

In the above-mentioned state, position detection coils 14Ba, 14Bb, 14Bc and 14Bd are regularly disposed in the short direction of ceramic intermediate plate 12 of mobile terminal placement plate 6.

Figure 14:
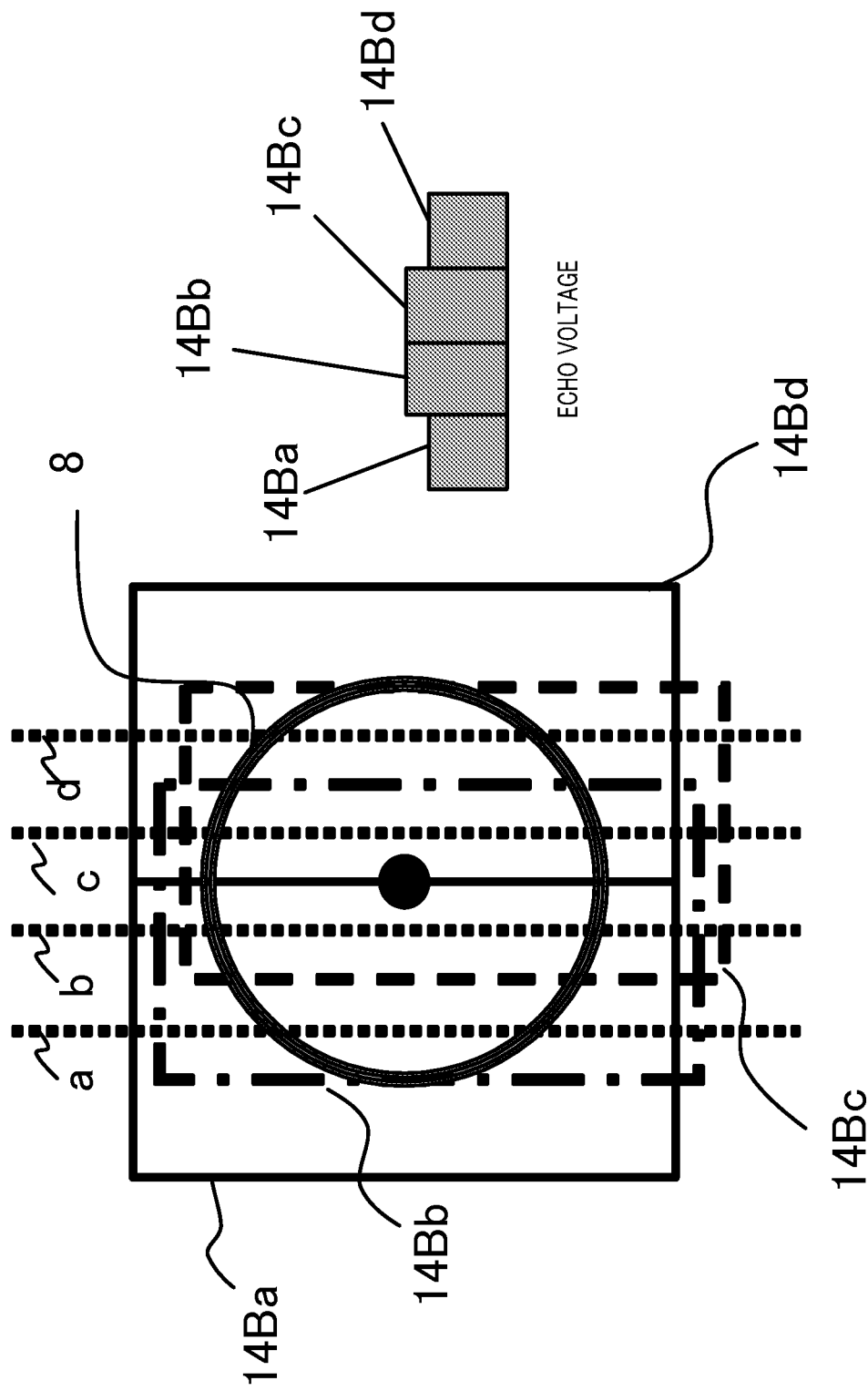
FIG. 14 illustrates a relationship between the detection coil and a charging coil of the same.

Next, with reference to FIG. 14, the relationship among position detection coils 14Ba, 14Bb, 14Bc and 14Bd, and point A that is the center portion of main body case 7 is described.

In FIG. 14, position detection coils 14Ba, 14Bb, 14Bc and 14Bd are shifted also in the vertical direction for differentiation, but actually, position detection coils 14Ba, 14Bc and 14Bd are disposed as illustrated in FIG. 13.

In FIG. 14, "a" is a center line passing through the center of the short side of position detection coil 14Ba, "b" a center line passing through the center of the short side of position detection coil 14Ba, "c" a center line passing through the center of the short side of position detection coil 14Ba, and "d" a center line passing through the center of the short side of position detection coil 14Ba.

Here, it is important that the center point of charging coil 8 in a standby state at the point A do not overlap any of the center lines a, b, c and d of position detection coils 14Ba, 14Bb, 14Bc and 14Bd as illustrated in FIG. 14.

That is, after the charging is completed, charging coil 8 is moved to a position that does not overlap any of the center lines a, b, c and d of position detection coils 14Ba, 14Bb, 14Bc and 14Bd (a part apart from the center lines a, b, c and d of position detection coils 14Ba, 14Bb, 14Bc and 14B) such that charging coil 8 is brought into a stand-by state at this position A (at S2 or S7 in FIG. 10).

It is to be noted that, in the present embodiment, the detection whether mobile terminal 15 is put on the top surface of mobile terminal placement plate 6 (at S8 in FIG. 10) is performed on the side of position detection coils 14Ba, 14Bb, 14Bc and 14Bd, and therefore a position that does not overlap the center lines a, b, c and d of position detection coils 14Ba, 14Bb, 14Bc and 14Bd is set as position A at which charging coil 8 is brought into a stand-by state.

As a matter of course, the detection whether mobile terminal 15 is put on the top surface of mobile terminal placement plate 6 (at S8 in FIG. 10) may be performed on the side of position detection coils 14Aa, 14Ab, 14Ac, and 14Ad, and in that case, a position that does not overlap the center lines a, b, c and d of position detection coils 14Aa, 14Ab, 14Ac and 14Ad is set as position A at which charging coil 8 is brought into a stand-by state.

On the basis of the above-mentioned configuration, the operation is described in more detail. When power switch 40 is turned ON to charge mobile terminal 15 (at S4 in FIG. 10), control section 10 determines whether charging coil 8 is present at point A as described above (at S5 in FIG. 10 and FIG. 15).

This determination can be carried out based on the driving amount of motors 28 and 33 that is stored in X-axial motor control section 36 and Y-axial motor control section 37.

Figure 15:
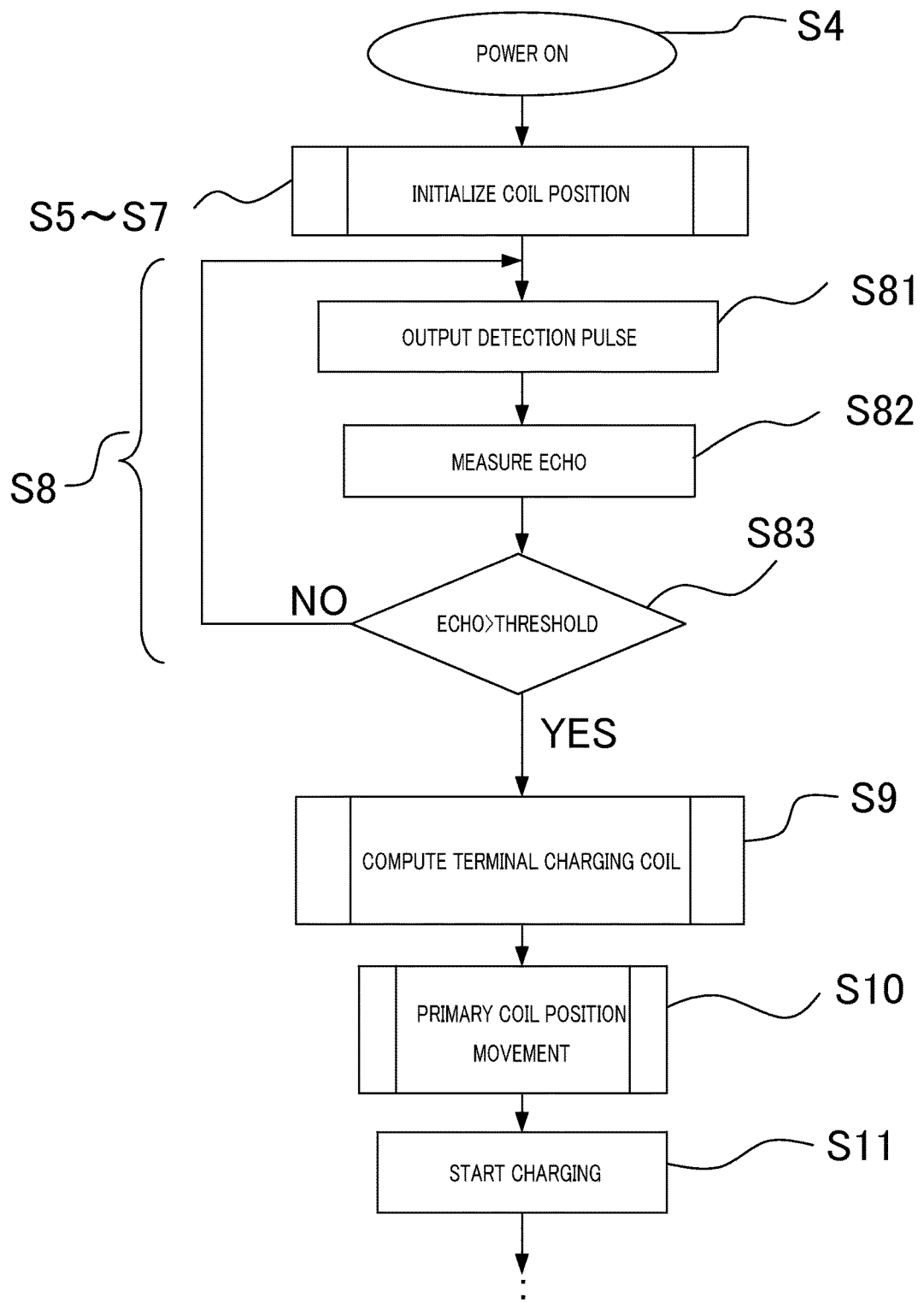
FIG. 15 is a flowchart of an operation of the same.

When it is determined that charging coil 8 is not present at point A, control section 10 moves charging coil 8 to point A (at S6 in FIG. 10 and FIG. 15), and brings charging coil 8 into a charging standby state at point A (at S7 in FIG. 10 and FIG. 15).

Next, control section 10 detects the position where mobile terminal 15 is put on the top surface of mobile terminal placement plate 6 with use of position detection coil 14 (at S8 and S9 in FIG. 10 and FIG. 15).

Actually, the position where mobile terminal 15 is put is the position of the mobile charging coil (15a in FIG. 16) incorporated in mobile terminal 15.

This configuration is described below in detail with reference to FIG. 14 and FIG. 15. When determining the position where mobile terminal 15 is put on the top surface of mobile terminal placement plate 6 with use of position detection coil 14, a 1 MHz pulse signal is sequentially suppled to position detection coils 14Ba, 14Bb, 14Bc and 14Bd from detecting coil control section 39 illustrated in FIG. 9 (at S81 in FIG. 15). Control section 10 determines the position where mobile terminal 15 is put on the top surface of mobile terminal placement plate 6 (at S82 and S83 in FIG. 15) based on whether an echo signal comes from the mobile charging coil (15a in FIG. 16) of mobile terminal 15 in response to the 1 MHz pulse signal.

It is to be noted that the echo signal caught at this time by position detection coils 14Ba, 14Bb, 14Bc and 14Bd is temporarily stored in memory 10a illustrated in FIG. 9.

It is well known that the mobile charging coil (15a in FIG. 16) of mobile terminal 15 resonates at 1 MHz before charging. As such, the mobile charging coil outputs a large echo signal when the 1 MHz pulse signal is sequentially output to position detection coils 14Ba, 14Bb, 14Bc and 14Bd, and then position detection coils 14Ba, 14Bb, 14Bc and 14Bd catch the echo signal. In this manner, the position where mobile terminal 15 is put on the top surface of mobile terminal placement plate 6 is detected.

Figure 16:
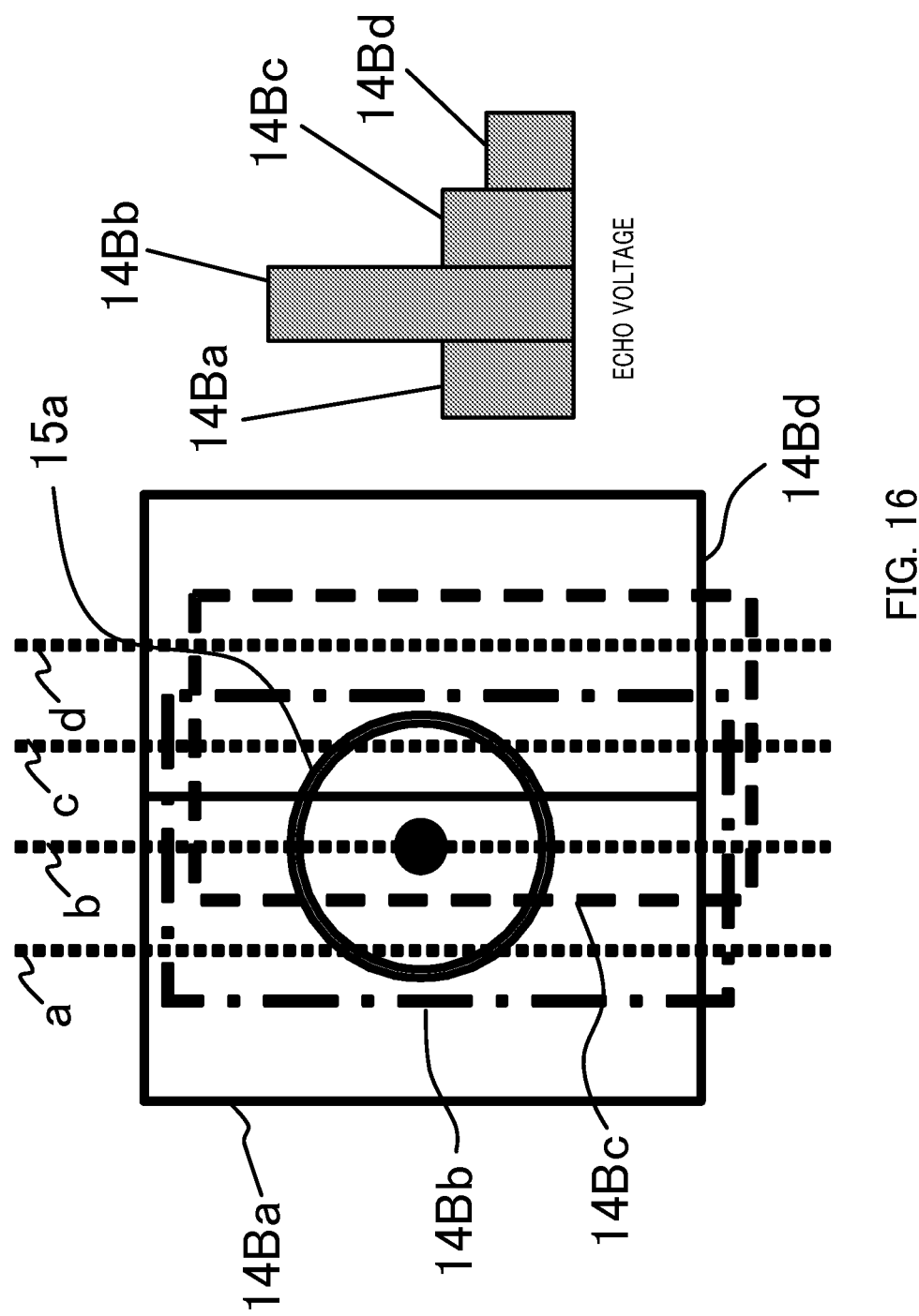
FIG. 16 illustrates a relationship between the detection coil and the charging coil of the same.

FIG. 16 illustrates a state where the mobile charging coil 15a of mobile terminal 15 is put on the top surface of mobile terminal placement plate 6 at a position on the center line b of position detection coil 14Bb, and FIG. 16 suggests that the echo signal caught at position detection coil 14Bb has the largest value among position detection coils 14Ba, 14Bb, 14Bc and 14Bd.

Figure 17:
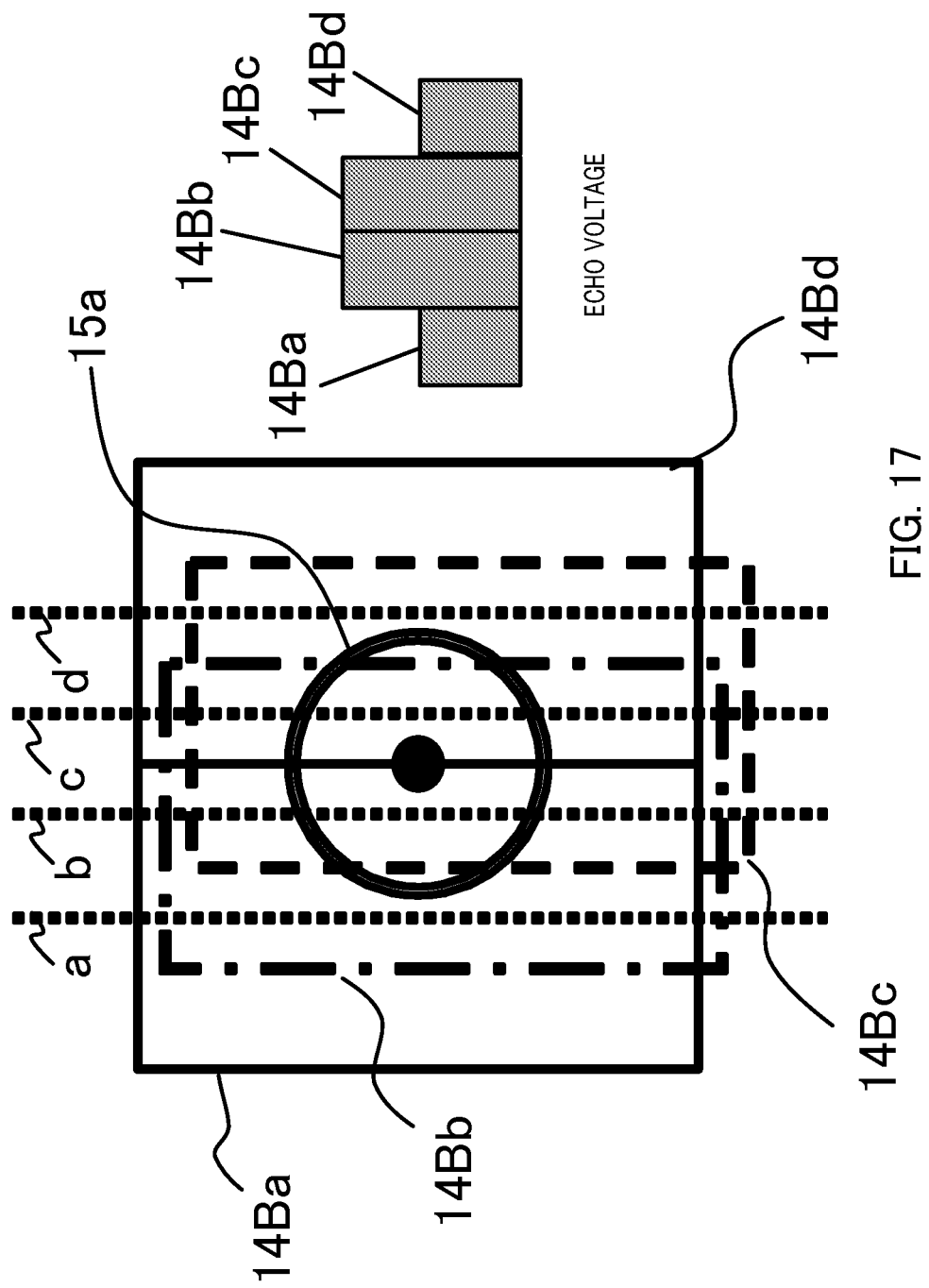
FIG. 17 illustrates a relationship between the detection coil and the charging coil of the same.

In contrast, FIG. 17 illustrates a state where the mobile charging coil 15a of mobile terminal 15 is put on the top surface of mobile terminal placement plate 6 at a position between center lines b and c of position detection coils 14Bb and 14Bc, and FIG. 17 suggests that the echo signals caught at position detection coils 14Bb and 14Bc are larger than those of position detection coils 14Ba and 14Bd but are smaller than the echo signal of FIG. 16.

In addition, depending on the type or the state (for example, a cover is provided on the rear surface, or a seal is stuck on the rear surface) of mobile terminal 15, the echo signal from mobile charging coil 15a of mobile terminal 15 may be as small as that of FIG. 17. The determination level of the echo signal is set at a low level such that the position where mobile terminal 15 is put on the top surface of mobile terminal placement plate 6 can be detected even in the above-mentioned cases.

However, when the determination level of the echo signal is set at a low level, malfunction may be caused by the echo signal from charging coil 8.

Figure 18:
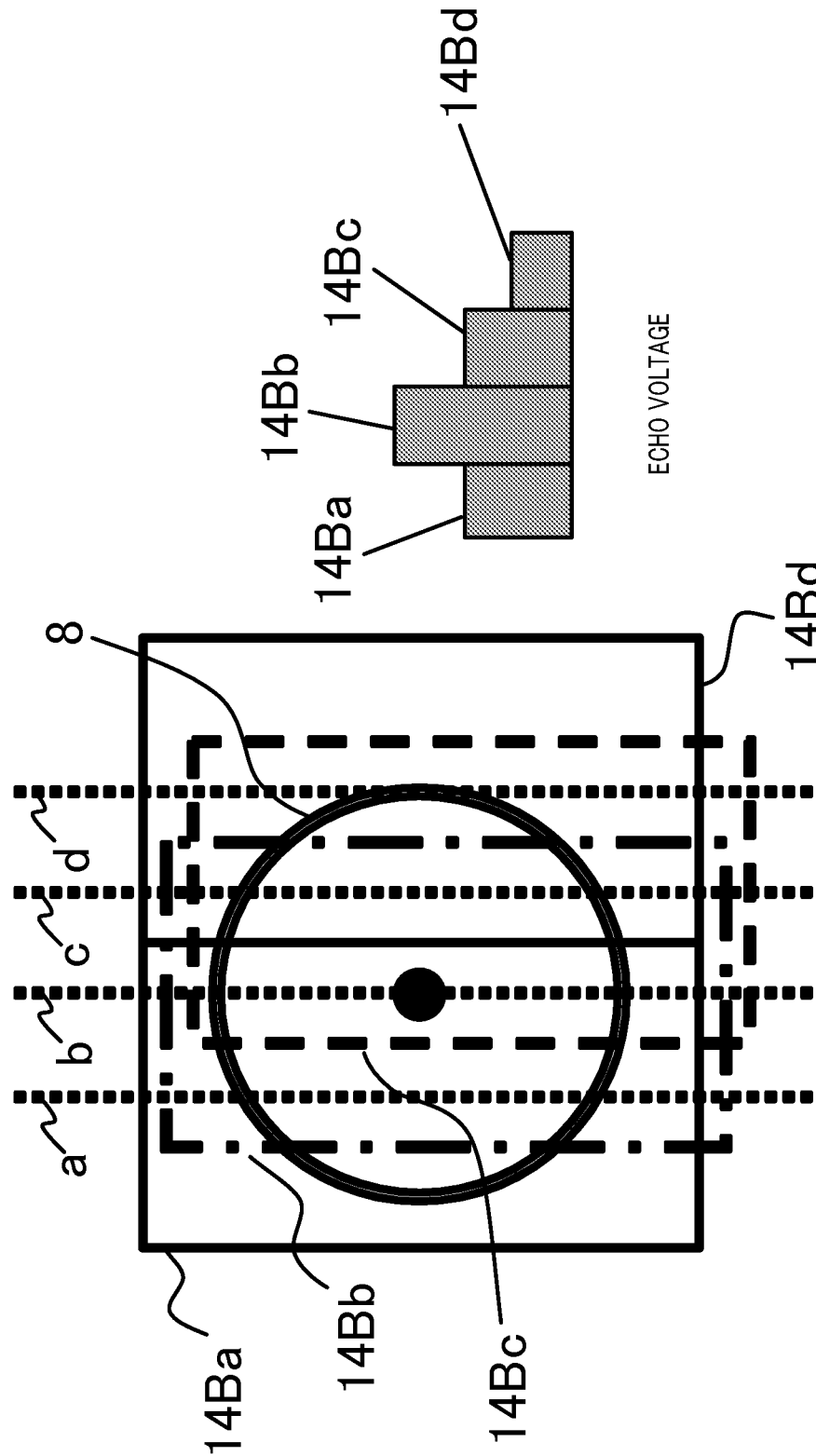
FIG. 18 illustrates a relationship between the detection coil and the charging coil of the same.

FIG. 18 illustrates a case where the standby position A of charging coil 8 is located under center line b of position detection coil 14Bb, for example. FIG. 18 suggests that, in this case, the echo signal from charging coil 8 caught at position detection coil 14Bb has a high value and is largest among position detection coils 14Ba, 14Bb, 14Bc and 14Bd.

In such a state, it is impossible to determine whether the echo signal caught at position detection coils 14Ba, 14Bb, 14Bc and 14Bd is from mobile charging coil 15a or charging coil 8, and consequently, malfunction may be caused in the subsequent operations.

That is, as described above, depending on the position of mobile terminal 15 put on the top surface of mobile terminal placement plate 6, the type of mobile terminal 15, and the state (for example, a cover is provided on the rear surface, or a seal is stuck on the rear surface) of mobile terminal 15, the echo signal from the mobile charging coil 15a of mobile terminal 15 may be small as in FIG. 17. The determination level of the echo signal is set at a low level such that the position of mobile terminal 15 put on the top surface of mobile terminal placement plate 6 can be detected even in the above-mentioned cases.

However, when the determination level is set at a low level in this manner, control section 10 determines that mobile terminal 15 is put on the top surface of mobile terminal placement plate 6 and executes the subsequent operations even when mobile terminal 15 is not put on the top surface of mobile terminal placement plate 6 in the case where the level of the echo signal from charging coil 8 is high as in FIG. 18.

Malfunction may be caused in the above-mentioned manner, and in the present embodiment, to prevent the malfunction, the position A where charging coil 8 is brought into the stand-by state is set to a position that does not overlap any of the center lines a, b, c and d of position detection coils 14Ba, 14Bb, 14Bc and 14Bd (a part apart from the center lines a, b, c and d of position detection coils 14Ba, 14Bb, 14Bc and 14B) after the charging is completed as described above.

As a result, as illustrated in FIG. 14, the echo signal from charging coil 8 caught at position detection coils 14Ba, 14Bb, 14Bc and 14B may be set to a small value (or may be set to a value sufficiently smaller than that of FIG. 17).

Therefore, whether mobile terminal 15 is put on the top surface of mobile terminal placement plate 6 is determined without error, and malfunction is prevented from being caused in the subsequent stages.

Then when it is determined that mobile terminal 15 is put on the top surface of mobile terminal placement plate 6, control section 10 controls detecting coil control section 39 to supply a pulse signal to position detection coils 14Aa, 14Ab, 14Ac and 14Ad and position detection coils 14Ba, 14Bb, 14Bc and 14Bd, thereby specifying mobile charging coil 15a of mobile terminal 15 (at S9 in FIG. 15).

When the position of mobile charging coil 15a of mobile terminal 15 has been successfully specified, control section 10 drives motors 28 and 33 through X-axial motor control section 36 and Y-axial motor control section 37, and moves charging coil 8 to the position of mobile charging coil 15a of the detected mobile terminal 15 (at S10 in FIG. 10 and FIG. 15), and thereafter, starts charging through charging coil control section 38 (at S11 and S12 in FIG. 10).

Next, the most outstanding feature of the present embodiment is described with reference to FIG. 19 to FIG. 21.

In the present embodiment, as described above, when the power switch is turned OFF (at S1 in FIG. 10), charging coil 8 is moved to the center (standby position, hereinafter referred to as point A) of main body case 7 as illustrated in FIG. 4 to FIG. 6 (at S2 in FIG. 10), and thereafter the power source is turned OFF (at S3 in FIG. 10).

In addition, also during the charging, an operation same as that disclosed in PTL 1 (Japanese Patent Application Laid-Open No. 2009-247194) is carried out to determine whether power transmission is allowed (charging is completed) (at S13 in FIG. 10). When it is determined that power transmission is not allowed (full charge), control section 10 stops the power transmission (at S14 in FIG. 10).

When the above-mentioned charging operation is completed, control section 10 determines whether charging coil 8 is present at point A (at S15 in FIG. 10), and thereafter control section 10 brings back charging coil 8 to point A (at S6 in FIG. 10).

In addition, even during the charging of mobile terminal 15, when mobile terminal 15 is put off from mobile terminal placement plate 6, it is determined whether power transmission is allowed (charging is completed) (at S13 in FIG. 10).

Also in this case, control section 10 stops the power transmission (at S14 in FIG. 10), and then determines whether charging coil 8 is present at point A (at S15 in FIG. 10), and thereafter control section 10 brings back charging coil 8 to point A (at S6 in FIG. 10).

That is, in the present embodiment, when the charging is completed, charging coil 8 is moved to position A (standby position) and brought into a standby state.

To be more specific, a position that does not overlap any of the center lines a, b, c and d of position detection coils 14Ba, 14Bb, 14Bc and 14Bd (a part apart from the center lines a, b, c and d of position detection coils 14Ba, 14Bb, 14Bc and 14B) is set to the standby position of charging coil 8 (position A), and after the charging is completed, charging coil 8 is moved to position A and the power source is turned OFF.

Since the present embodiment has the above-mentioned feature, it is possible to prevent erroneous determination that mobile terminal 15 is put on the top surface of mobile terminal placement plate 6 when mobile terminal 15 is not put on the top surface of mobile terminal placement plate 6 as described above, and as a result, malfunction is prevented from being caused in the subsequent stages.

In addition, even when mobile terminal placement plate 6 is mistakenly touched with hands and an overload is exerted on mobile terminal placement plate 6, charging coil 8 is moved to position A (for example, a center portion) of main body case 7 as illustrated in FIG. 4 to FIG. 6, thereby bearing the overload with charging coil 8, holding member 16, support leg 17, and support plate 18.

Accordingly, the overload can be borne with support plate 18 through mobile terminal placement plate 6, charging coil 8, holding member 16, and support leg 17, and thus it is possible to limit a damage of mobile terminal placement plate 6 and charging coil 8.

While charging coil 8 is brought back to a standby position (position A) when the charging operation is completed or interrupted in the present embodiment as described above, further improvement is desired in the operation at the time of the interruption of charging, for example.

For example, when mobile terminal 15 which is being charged is put off from the top surface of mobile terminal placement plate 6 during the driving of automobile 1, control section 10 terminates the charging operation (at S14 in FIG. 10), and then determines whether charging coil 8 is present at point A (at S15 in FIG. 10). Thereafter, control section 10 brings back charging coil 8 to point A (at S6 in FIG. 10).

At this time, when motor 28 for X-axial drive shaft 22 is driven to bring back charging coil 8 to point A, worm 27, worm wheel 25, and gear 26 also quickly move.

In addition, when motor 33 for Y-axial drive shaft 23 is driven to bring back charging coil 8 to point A, worm 32, worm wheel 30, and gear 31 also quickly move.

Here, a problem of operation sound arises when motor 28, worm 27, worm wheel 25, and gear 26 for X-axial drive shaft 22, and motor 33, worm 32, worm wheel 30 and gear 31 for Y-axial drive shaft 23 move in the case where mobile terminal 15 is put off from the top surface of mobile terminal placement plate 6 as described above.

Specifically, in the case where mobile terminal 15 is put on mobile terminal placement plate 6 to charge mobile terminal 15, the operation sound for moving charging coil 8 to the place where mobile terminal 15 is put reassures the user that charging coil 8 is moving for the charging operation (charging operation is normally activated).

However, in the case where charging is stopped, when the operation sound is generated even when charging is stopped, the user may be confused by the sound. When driving automobile 1 in particular, the driver is responsive to sound, and therefore it is desirable to reduce the operation sound as much as possible.

In view of this, in the present embodiment, in the case where charging is stopped or interrupted, the operation sound caused by the operation for bringing back charging coil 8 to point A is reduced.

Figure 20:
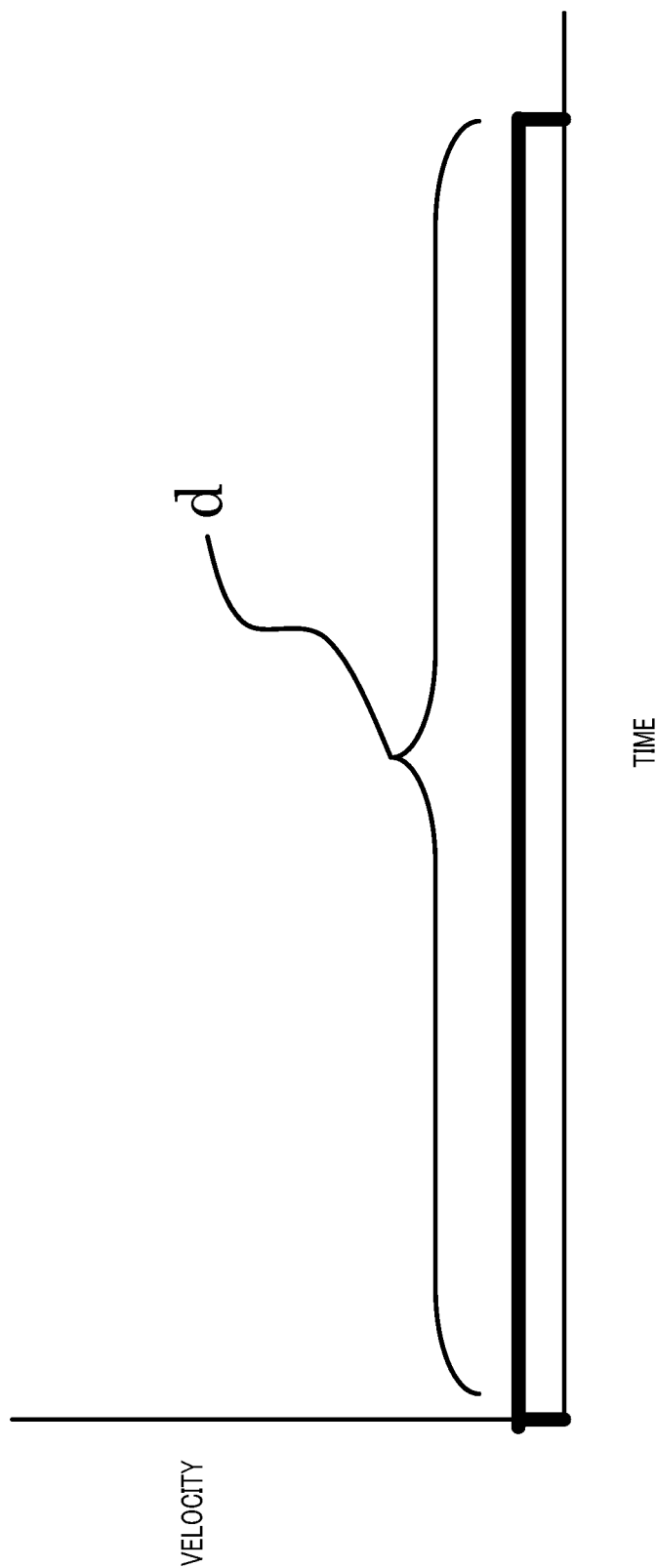
FIG. 20 illustrates a state where the charging coil is moved from the charging position to the standby position of the same.

To be more specific, as illustrated in FIG. 20, in the case where charging is stopped or interrupted, the rotational frequency (or the pulse rate, when stepping motors are used) of at least one of motors 28 and 33 used for bringing back charging coil 8 to point A is considerably reduced. This configuration is described in detail below.

Figure 19:
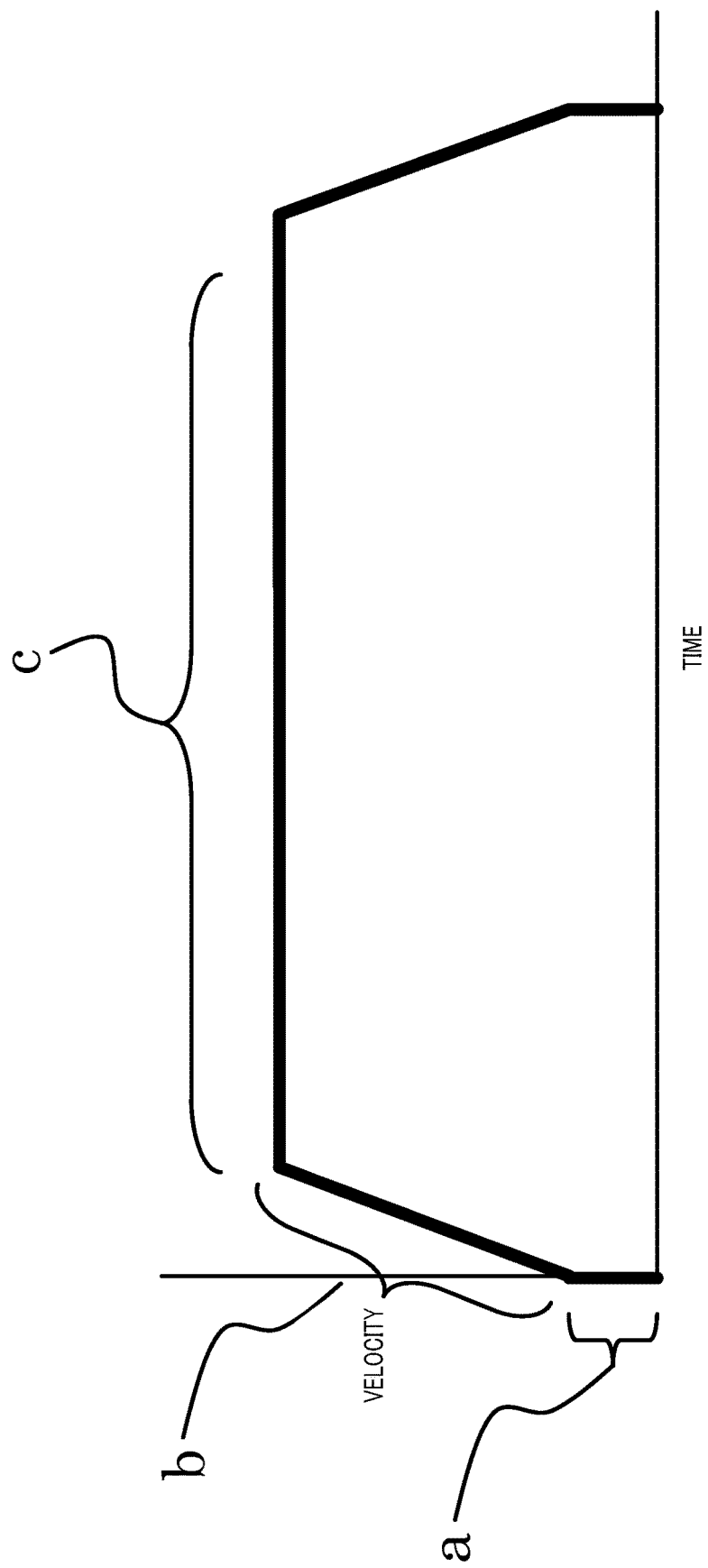
FIG. 19 illustrates a state where the charging coil is moved from a standby position to a charging position of the same.

FIG. 19 shows the velocity of motors 28 and 33 at the time when control section 10 moves charging coil 8 to a position of the mobile charging coil (15a in FIG. 16) of mobile terminal 15 for the purpose of charging (at S10 in FIG. 10).

First, motors 28 and 33 rise at 10 mm/1 sec ("a" in FIG. 19), and then the velocity is increased ("b" in FIG. 19), and thereafter, motors 28 and 33 are stably driven at a velocity of 60 mm/1 sec ("c" in FIG. 19).

That is, when charging coil 8 is moved to a position of the mobile charging coil (15a in FIG. 16) of mobile terminal 15 (at S10 in FIG. 10), charging coil 8 is moved to the position in a short time as much as possible so that charging is quickly started.

Figure 21:
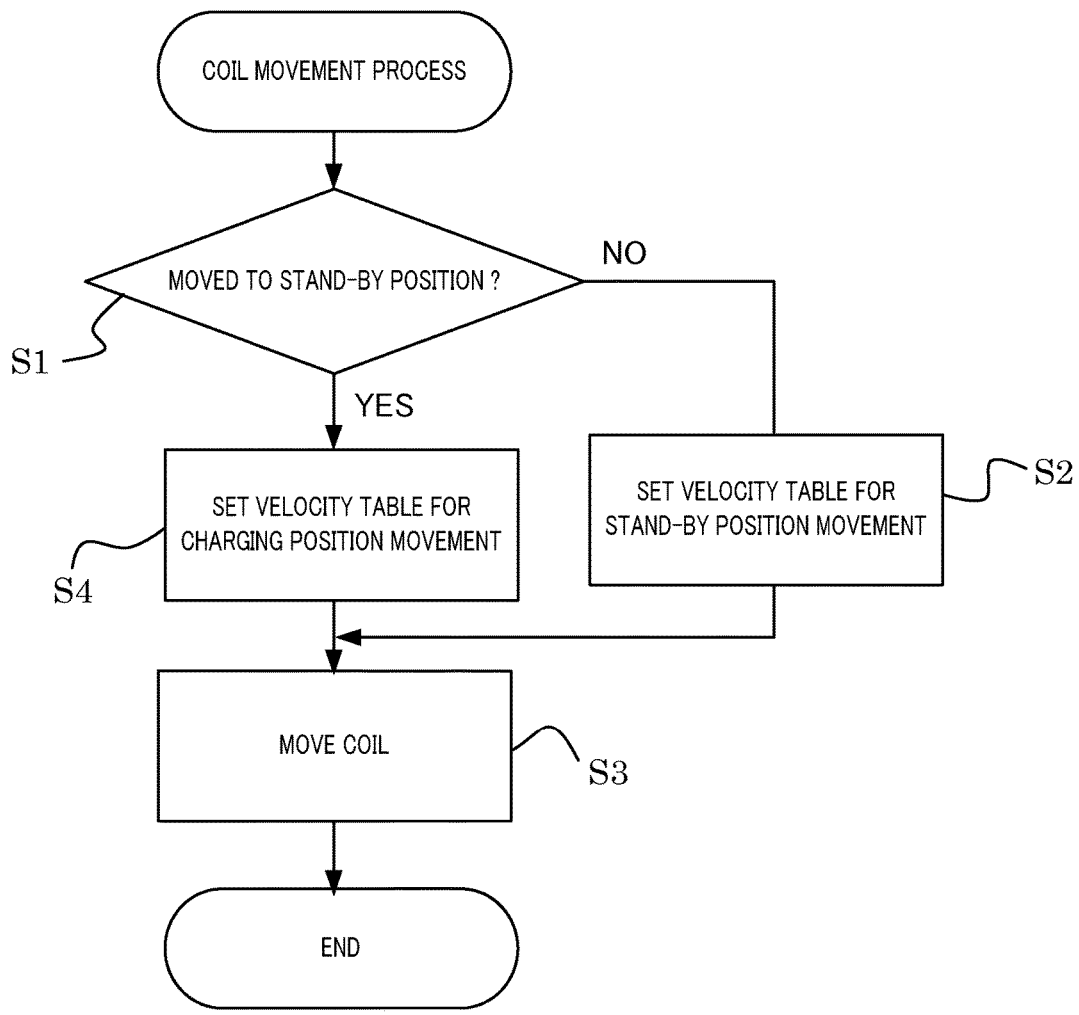
FIG. 21 is a flowchart of an operation of the same.

At this time, control section 10 determines whether the movement of charging coil 8 is a movement to the standby position or a movement to the charging position (at S1 in FIG. 21). When the movement is a movement to the charging position, control section 10 moves charging coil 8 in accordance with a velocity table (FIG. 19) stored in memory 10a (at S2 and S3 in FIG. 21).

In contrast, in the case where the charging is stopped or interrupted, the rotational frequency of motors 28 and 33 is considerably reduced as illustrated in FIG. 20 at the time when charging coil 8 is brought back to point A.

To be more specific, when charging coil 8 is brought back to point A in the case where charging is stopped or interrupted, the rotational frequency of motors 28 and 33 is kept in a substantially constant state at 4 mm/1 sec ("d" in FIG. 20) from activation to stopping, as illustrated in FIG. 20.

That is, at this time, motors 28 and 33 are driven at a velocity lower than the velocity of the activation ("a" in FIG. 19), and, as a matter of course, lower than the velocity of the stable driving ("c" in FIG. 19) of the above-mentioned case where charging coil 8 is moved to a position of the mobile charging coil (15a in FIG. 16) of mobile terminal 15.

At this time, control section 10 determines whether the movement of charging coil 8 is a movement to the standby position or a movement to the charging position (at S1 in FIG. 21), and moves charging coil 8 in accordance with the velocity table (FIG. 20) stored in memory 10a (at S3 and S4 in FIG. 21) when the movement is a movement to the standby position.

With this configuration, the operation sound caused by the operation of motor 28, worm 27, worm wheel 25, and gear 26 for X-axial drive shaft 22, and motor 33, worm 32, worm wheel 30 and gear 31 for Y-axial drive shaft 23 is significantly small, and thus the operation sound does not make the user uncomfortable.

Further, a case where motors 28 and 33 are stepping motors is described in detail.

It is known that, as the characteristics of the human ear, the human ear is sensitive to some frequencies, but is not sensitive to the other frequencies. According to Fletcher- Munson curve that is widely known to represent the characteristics of the human ear, as the frequency decreases, the sensitivity of the human ear decreases in the frequency ranges lower than about 1 kHz.

In view of this, in the movement of charging coil 8 of the present embodiment, when the pulse rate of stepping motor falls within the frequency range that is lower than about 1 kHz, the lower the frequency, the smaller the operation sound, and thus the operation sound does not make the user uncomfortable.

In addition, the operation sound caused by the operation of motor 28, worm 27, worm wheel 25, and gear 26 for X-axial drive shaft 22, and motor 33, worm 32, worm wheel 30 and gear 31 for Y-axial drive shaft 23 is large at a specific resonance point that is determined by main body case 7, mobile terminal placement plate 6 and the like of mobile terminal charging apparatus 5.

Accordingly, when the pulse rate of the stepping motor in the stable operation is set to a low frequency, for example, to 40 Hz, almost no specific resonance point exists before reaching 40 Hz or in the range of 0 to 40 Hz. Also in this manner, the operation sound caused by driving motors 28 and 33 can be made less uncomfortable for the user.

In particular, the driver is sensitive to sound when driving automobile 1, and therefore the configuration in which the operation sound is small is advantageous.

In addition, although the time for bringing back charging coil 8 to point A is lengthened when motors 28 and 33 are driven at a low velocity, this causes no problem since charging is stopped or interrupted in that case.

This application is entitled to and claims the benefit of Japanese Patent Application No. 2013-114994 dated May 31, 2013, the disclosure of which including the specification, drawings and abstract is incorporated herein by reference in its entirety.

INDUSTRIAL APPLICABILITY

As has been described, in the present invention, the charging coil is moved by the driving section from the charging position to the standby position at the time of completion of charging or interruption of charging, and as described, the charging coil is moved from the charging position to the standby position at a velocity lower than that of the movement of the charging coil from the standby position to the charging position. Thus, the operation sound at this time is significantly small and less uncomfortable for the user.

Therefore, application of the present invention to in-vehicle and home-use mobile terminal charging apparatuses is promising.

REFERENCE SIGNS LIST

1 Automobile
2 Vehicle interior
3 Wheel
4 Electronic equipment
5 Mobile terminal charging apparatus
6 Mobile terminal placement plate
7 Main body case
8 Charging coil
9 Driving section
10 Control section
10a Memory
11 Surface plate
12 Intermediate plate
13 Rear surface plate
14 Position detection coil
14A, 14Aa, 14Ab, 14Ac, 14Ad, 14B, 14Ba, 14Bb, 14Bc, 14Bd Position detection coil
15 Mobile terminal
15a Mobile charging coil
16 Holding member
17 Support leg
18 Support plate
19 Control substrate
20 Bottom surface plate
21 Supporting member
22 X-axial drive shaft
23 Y-axial drive shaft
24 Through hole
25 Worm wheel
26 Gear
27 Worm
28 Motor
29 Gear plate
30 Worm wheel
31 Gear
32 Worm
33 Motor
34 Gear plate
35 Flexible wiring
36 X-axial motor control section
37 Y-axial motor control section
38 Charging coil control section
39 Detecting coil control section
41 Switch
42 Switch

The invention claimed is:

1. A mobile terminal charging apparatus comprising:
a main body case including a mobile terminal placement plate disposed on a top surface of the main body case;
a detection section that detects a position of a mobile terminal placed on a top surface of the mobile terminal placement plate;
a charging coil movably disposed in the main body case to face a bottom surface side of the mobile terminal placement plate;
a driving section that moves the charging coil; and
a control section connected with the driving section and the charging coil, wherein:
the control section controls the driving section to move the charging coil from a standby position to a charging position when the mobile terminal is charged with the charging coil, the charging position facing the mobile terminal that is detected by the detection section;
the control section controls the driving section to move the charging coil from the charging position to the standby position when the charging is completed or interrupted; and,
when the charging coil is moved from the charging position to the standby position, the charging coil is moved at a velocity lower than a velocity of the charging coil that is moved from the standby position to the charging position.

2. The mobile terminal charging apparatus according to claim 1, wherein a stable operation velocity of the charging coil that is moved from the charging position to the standby position is lower than a stable operation velocity of the charging coil that is moved from the standby position to the charging position.

3. The mobile terminal charging apparatus according to claim 1, wherein the detection section is composed of a plurality of detection coils, and, when charging of the mobile terminal with the charging coil is completed or interrupted, the control section controls the driving section to move the charging coil to a standby position set at a position where a center point of the charging coil is apart from each of center points of the detection coils.

4. The mobile terminal charging apparatus according to claim 1, wherein a support leg is provided below the charging coil, and a gap is provided between a bottom surface of the support leg and a top surface of a support plate disposed below the support leg.

5. The mobile terminal charging apparatus according to claim 1, wherein the driving section drives a stepping motor at a pulse rate of a frequency lower than about 1 kHz.

6. The mobile terminal charging apparatus according to claim 5, wherein the control section reduces the velocity of a movement of the charging coil by reducing the pulse rate.

7. An automobile comprising the mobile terminal charging apparatus according to claim 1, wherein the mobile terminal charging apparatus is disposed in the automobile.

* * * * *